US012715775B2

(12) United States Patent
Stucky et al.

(10) Patent No.: US 12,715,775 B2
(45) Date of Patent: Aug. 25, 2026

(54) MULTI-STAGE MAGNESIOTHERMIC REDUCTION FOR PRODUCTION OF SILICON OXIDES WITH REDUCED SILICON GRAIN SIZE

(71) Applicants: The Regents of the University of California, Oakland, CA (US); Mitsubishi Chemical Corporation, Tokyo (JP)

(72) Inventors: Galen D. Stucky, Santa Barbara, CA (US); Xudong Hu, Goleta, CA (US); Yang Zhao, Santa Barbara, CA (US); Hengbin Wang, Santa Barbara, CA (US); Naoto Maru, Kawasaki (JP)

(73) Assignees: The Regents of the University of California, Oakland, CA (US); MITSUBISHI CHEMICAL CORPORATION, Tokyo (JP)

( * ) Notice: Subject to any disclaimer, the term of this patent is extended or adjusted under 35 U.S.C. 154(b) by 721 days.

(21) Appl. No.: 17/951,571

(22) Filed: Sep. 23, 2022

(65) Prior Publication Data

US 2023/0108286 A1 Apr. 6, 2023

Related U.S. Application Data

(60) Provisional application No. 63/247,664, filed on Sep. 23, 2021.

(51) Int. Cl.
*C01B 33/023* (2006.01)
*H01M 8/14* (2006.01)

(52) U.S. Cl.
CPC ........... *C01B 33/023* (2013.01); *H01M 8/144* (2013.01); *C01P 2004/64* (2013.01); *C01P 2006/12* (2013.01); *C01P 2006/40* (2013.01); *H01M 2008/147* (2013.01)

(58) Field of Classification Search
None
See application file for complete search history.

(56) References Cited

U.S. PATENT DOCUMENTS

2019/0081316 A1* 3/2019 Zoitos ................ H01M 4/5825

OTHER PUBLICATIONS

Zhou et al ("Optimizing the function of SiOx in the porous Si/SiOx network via a controllable magnesiothermic reduction for enhanced lithium storage", J Alloys and Compounds, vol. 874, (2021) 159913, pp. 1-10 which was available online Apr. 20, 2021) (Year: 2021).*

Entwistle, J., et al., "A review of magnesiothermic reduction of silica to porous silicon for lithium-ion battery applications and beyond", Journal of Materials Chemistry A, 2018, pp. 18344-18356, vol. 6.

Curtis, I.S., et al., "Photocatalytic hydrogen generation using mesoporous silicon nanoparticles: influence of magnesiothermic reduction conditions and nanoparticle aging on the catalytic activity", Nanoscale, 2021, pp. 2685-2692, vol. 13.

(Continued)

*Primary Examiner* — Michael Forrest
(74) *Attorney, Agent, or Firm* — Gates & Cooper LLP

(57) ABSTRACT

A composite comprising a compound formed using a multistage magnesiothermic reduction reaction, wherein the compound comprises particles comprising silicon and oxygen. Applications of the composite in electrochemical cells are further described.

24 Claims, 16 Drawing Sheets

(56) References Cited

OTHER PUBLICATIONS

Li, C., et al., "Silicon Derived from Glass Bottles as Anode Materials for Lithium Ion Full Cell Batteries", Scientific Reports, pp. 1-11, vol. 7, No. 917.
Yan, Z., et al., "High-performance silicon-carbon anode material via aerosol spray drying and magnesiothermic reduction", Nano Energy, 2019, pp. 1-7, vol. 63.
Doremus, R.H., "Viscosity of silica", Journal of Applied Physics, Dec. 2002, pp. 7619-7629, vol. 92, No. 12.
Yoo, J-K, et al., "Extremely High Yield Conversion from Low-Cost Sand to High-Capacity Si Electrodes for Li-Ion Batteries", Advanced Energy Materials, 2014, pp. 1-9, vol. 4.

* cited by examiner (a)
Intensity (a.u.)
2 Theta (degree)
Si PDF-# 77-2110
(111)
(220)
(311)
(400)(331)(422)
Si@SiOx_950
Si@SiOx_NA
Borosilicate (b)
Intensity (a. u.)
Binding Energy (eV)
O1s
OKLL
NaKLL
C1s MgKLL
B1s
Si2s
Si2p
O2s
Si@SiOx_950
Si@SiOx_NA (c)
Intensity (a. u.)
Binding Energy (eV)
Raw data
Fitted data (d)
Intensity (a. u.)
Binding Energy (eV)
Raw data
Fitted data (a)
Volume Adsorbed (cm3 g-1 STP)
Relative Pressure (P/P0)

(b)
Pore Area (m2 g-1)
Pore Size (nm)

(c)
Pore Volume (cm3 g-1)
Pore Size (nm)

(d)
Microcrack
Si Grain
Mesopore
Heat treatment

MULTI-STAGE MAGNESIOTHERMIC REDUCTION FOR PRODUCTION OF SILICON OXIDES WITH REDUCED SILICON GRAIN SIZE

CROSS REFERENCE TO RELATED APPLICATIONS

This application claims the benefit under 35 U.S.C. Section 119 (e) of co-pending and commonly-assigned U.S. Provisional Application Ser. No. 63/247,664, filed on Sep. 23, 2021, by Galen D. Stucky, Xudong Hu, Yang Zhao, Hengbin Wang, and Naoto Maru, entitled "MULTI-STAGE MAGNESIOTHERMIC REDUCTION FOR PRODUCTION OF SILICON OXIDES WITH REDUCED SILICON GRAIN SIZE," attorneys' docket number G&C 30794.0807USP1 (UC 2021-972-1), which application is incorporated by reference herein.

BACKGROUND OF THE INVENTION

1. Field of the Invention

This invention relates to composites useful as electrodes in electrochemical cells and methods of making the same.

2. Description of the Related Art (Note: This application references a number of different publications as indicated throughout the specification by one or more reference numbers in superscripts. A list of these different publications ordered according to these reference numbers can be found below in the section entitled "References." Each of these publications is incorporated by reference herein.)

Silicon is attractive for introduction in the lithium-ion batteries (LIBs) due to its abundant sources and ten times the theoretical capacity of the state-of-the-art graphite-based anodes. [1-3] Hence, Si is considered as one of the most promising anode materials to replace or complement the commercial graphite in the next-generation LIBs.[4,5] Currently, the further improvement of the cycling stability is the key factor for the silicon-based anode materials to be finally accepted in the commercial market of energy storage.[1,6,7]

Loss of electrical contact with the current collector and particle fracture have been identified as two primary reasons for the capacity decay of silicon-based anode materials.[3,8] Both the loss of electrical contact and particle fracture are caused by the large volume change (~300%) during cycling.[9] Previous works demonstrated that reducing the particle size to the nanoscale allows for Si to withstand the (de) lithiation strains of the large volume change without fracture. However, nanosized Si still suffers from poor cycle life and low volumetric capacity density due to the unstable solid-electrolyte interphase (SEI) and its low tap density, respectively.[3,10] The large specific surface area of the nanosized Si results in much more formation of SEI and more binder to prevent the electrode from pulverization. Fabrication of electrochemically inactive matrix (EIM) can overcome the drawbacks of the nanosized Si despite some sacrifice of mass capacity density.[11] Besides, EIM has multiple advantages: (1) increasing the volumetric capacity density by increasing the tap density of the powder; (2) being the electrolyte barrier and reducing the formation of the unstable SEI on the surface of the active material; (3) reducing the undesirable side reaction between the active material and the electrolyte.

Efforts in the fabrication of Si@EIM have been made to enhance the electrochemistry of Si-based anode materials, including Si@$SiO_x$,[12-14] Si@$SiO_2$,[15,16] Si@$Cu_3Si$,[17,18] Si@SiC,[19,20] Si@$FeSi_2$,[21] Si@$NiSi_2$,[22,23] Si@PANI.[24,25] Among all of the Si@EIM structures, Si@$SiO_x$ has its unique advantages: (1) being able to be obtained from only one material (Silica or even glass including soda-lime and borosilicate); (2) strong connection by forming silicon oxides with continuously increasing oxygen across the interface from Si metal to silica matrix.

SUMMARY OF THE INVENTION

Silicon is one of the most promising anode materials to replace or complement the commercial graphite in lithium-ion batteries due to its ten times the theoretical capacity of the graphite. The main challenges for silicon anodes are pulverization and instability of the solid-electrolyte interphase caused by the large volume change (~300%) during cycling, and undesirable side reactions between the active material and the electrolyte. Reducing the particle size to the nanoscale combined with fabrications of the electrochemically inactive matrix is considered to be the most promising strategy to tackle both of the problems. Superior structure of nanosized Si grains embedded in $SiO_x$ matrix can be achieved by partial magnesiothermic reduction, while the magnesiothermic reduction as a positive-feedback process is difficult to control and easy to form uneven Si nanoparticles and even unexpected large Si domains in the products, which undermines advantages of the structure of nanosized Si in $SiO_x$ matrix. Here, we invented a multi-stage magnesiothermic reduction that tackled the uneven-reduction problem. The multi-stage magnesiothermic reduction with limited usage of magnesium in each stage can weaken the positive-feedback effect during the exothermic reaction by the distribution of the released heat into each stage, and thus reduces the reaction kinetics of the reduction and surprisingly and unexpectedly results in Si grains with smaller and more uniform size.

In one embodiment, hierarchical Si@$SiO_x$ nanostructures that nano-sized Si grains embedded in $SiO_x$ matrix with mesopores were successfully achieved by using low-cost borosilicate as precursor through a multi-stage magnesiothermic reduction that could reduce the Si grain size and avoid the formation of big silicon domains (hereinafter composite named MS-Si@$SiO_x$). Surprisingly, MS-Si@$SiO_x$ synthesized by multi-stage magnesiothermic reduction showed enhanced electrochemical performance as a lithium-ion battery anode in terms of Coulombic efficiencies (initial Coulombic efficiency and Coulombic efficiencies over cycling) and cycling stability and rate capability. Three-electrode full cells were constructed and demonstrated that the improved initial Coulombic efficiency of MS-Si@$SiO_x$ favored the capability of the full cell to a great extent. In the full-cell configuration, MS-Si@$SiO_x$//$LiFePO_4$ showed significant improvements in cycling stability, which highlights the practical application of the anode material synthesized by the multi-stage magnesiothermic reduction.

For example, taking advantage of the multi-stage magnesiothermic reduction, in one MS-Si@$SiO_x$ with small and uniform Si grains (~11 nm) inside was fabricated, resulting in enhanced electrochemical performance that included Coulombic efficiencies (71.70% for ICE and 99.68% for Coulombic efficiencies over cycling on average), cycling stability (1020.1 mAh $g^{-1}$ at 500 mA $g^{-1}$ after 100 cycles with retention of 85.1%), and rate capability.

The superiority of the multi-stage reduction is further demonstrated by the bottom-up synthesis of silicon nanoparticles from the Stöber silica nanoparticles.

BRIEF DESCRIPTION OF THE DRAWINGS

Referring now to the drawings in which like reference numbers represent corresponding parts throughout:

FIGS. 1A-1D. SEM images of (FIG. 1A) OS-Si@$SiO_x$ and (FIG. 1B) MS-Si@$SiO_x$. TEM images of (FIG. 1C) OS-Si@$SiO_x$ and (FIG. 1D) MS-Si@$SiO_x$ FIGS. 2A-2B. Line-scan STEM-EDS elemental analysis of (FIG. 2A) OS-Si@$SiO_x$ and (FIG. 2B) MS-Si@$SiO_x$ (The yellow arrows in the STEM dark-field Z contrast images indicate the line-scan profiles).

FIGS. 5A-5J. XPS survey spectra of (FIG. 5A) OS-Si@$SiO_x$ and (FIG. 5C) MS-Si@$SiO_x$. Si 2p XPS spectra of (FIG. 5B) OS-Si@$SiO_x$ and (FIG. 5D) MS-Si@$SiO_x$. (5E) Schematic illustration of the structure of the Si@$SiO_x$, and TEM images of (FIG. 5F) MS-Si@$SiO_x$ and (FIGS. 5H and 5I) OS-Si@$SiO_x$; HRTEM images of (FIG. 5G) MS-Si@$SiO_x$ and (FIG. 5J) OS-Si@$SiO_x$;

(FIG. 6A) Initial discharge/charge profiles at 200 mA $g^{-1}$. (FIG. 6B) Cycling performance at 500 mA $g^{-1}$ (electrodes were precycled at 200 mA $g^{-1}$ three times). (FIG. 6C) Schematic illustration of the lithium-storage behaviors of MS-Si@$SiO_x$ and OS-Si@$SiO_x$ in charging/discharging. (FIG. 6D) Rate capacities at various current densities (anodes were precycled at 200 mA $g^{-1}$ three times, galvanostatic discharge/charge at 100 mA $g^{-1}$ was performed between each two different current densities). FIG. 6E Cycling performance of MS-Si@$SiO_x$ at 1500 mA $g^{-1}$.

(FIG. 7A) Three-electrode profiles of the initial charge/discharge at 0.1 C (1 C=170 mA $g^{-1}$). (FIG. 7B) Cycling performance (the anodes were precycled in the half cell before assembled into the full cells).

(FIG. 8A) XRD patterns of the borosilicate precursor, Si@$SiO_x$N/A, and Si@$SiO_x$950; (FIG. 8B) XPS survey spectra of Si@$SiO_x$N/A and Si@$SiO_x$950; Si 2p XPS spectra of (FIG. 8C) Si@$SiO_x$N/A and (FIG. 8D) Si@$SiO_x$950.

(FIG. 9D) Schematic illustration of the effect of the heat treatment on the structure of the product.

(FIG. 10A) Initial charging/discharging of Si@$SiO_x$N/A, Si@$SiO_x$850, Si@$SiO_x$900, Si@$SiO_x$950, and Si@$SiO_x$1000 at 100 mA $g^{-1}$. (FIG. 10B) ICEs for the samples of varying SSAs with different temperatures of the heat treatment.

(FIG. 10C) Schematic illustration of the heat treatment improving the initial Coulombic efficiency.

(FIG. 11A) Schematic illustration of the three-electrode full cell. (FIG. 11B) Potential and Voltage profiles of the three-electrode full cells $LiFePO_4$/C//Si@$SiO_x$N/A and $LiFePO_4$/C//Si@$SiO_x$950, at 0.1 C (17 mA $g^{-1}$, based on the cathode mass).

DETAILED DESCRIPTION OF THE INVENTION

Figures 1A, 1C:
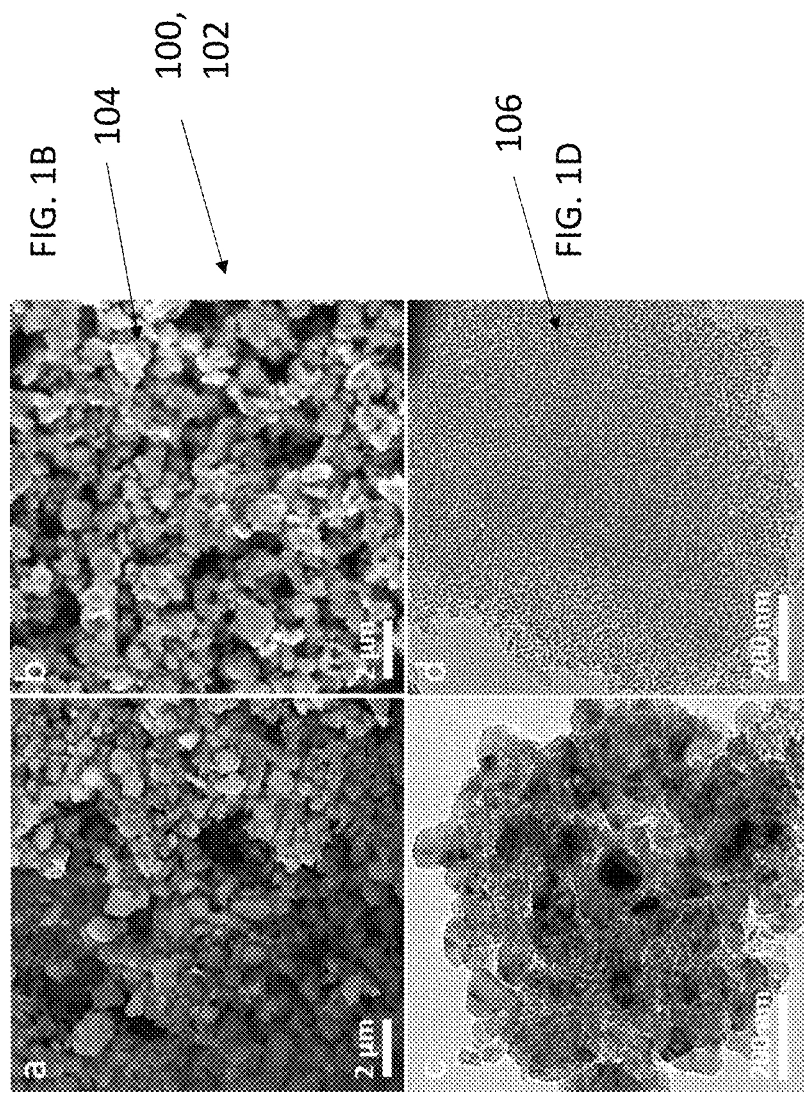

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Since Si metal does not exist in nature, Si metal is mainly obtained by reducing silica. The magnesiothermic reduction has been considered as one of the most practical processes to obtain Si metal on a large scale in a way of scavenging oxygen from silica.[26,27] The synthesis of Si nanoparticles in the $SiO_x$ matrix could be achieved by using partial magnesiothermic reduction. However, the magnesiothermic reduction as an exothermic reaction is a positive-feedback process,[28,29] which is difficult to control and always results in Si nanoparticles with uneven sizes and even unexpected large Si domains in the products, undermining all of the aforementioned advantages of the superior structure of Si nanoparticles in the $SiO_x$ matrix. In this work, a multi-stage magnesiothermic reduction was employed, for the first time, to tackle the uneven reduction problems. With a novel in-situ temperature measurement of the magnesiothermic reduction, we found that the multi-stage magnesiothermic reduction with limited usage of magnesium in each stage was able to weaken the positive-feedback effect during the exothermic reaction by the distribution of the released heat into each stage, and thus reduced the reaction kinetics of the reduction and resulted in smaller Si grain with uniform size. Low-cost borosilicate (~\$200 $t^{-1}$) was used as a precursor with several advantages compared with silica: (1) Borosilicate powder can be obtained directly by milling the glass bottles without pre-leaching and annealing; (2) The utilization of the borosilicate can ease the burden of waste disposal as many tons of the non-recycled glass ends up with the landfills;[30] (3) the much lower viscosity ($10^{9.1}$ Pa·s vs. $10^{>16}$ Pa·s for pure silica glass at 750° C.) facilitates the solid-phase mass diffusion during the magnesiothermic reduction;[31] (4) the remained boron in the form of doping in the products increases the electrical conductivity as well as the lithium-ion diffusion.[32,33] Taking the advantage of the multi-stage magnesiothermic reduction, an optimized Si@SiOx structure with small and uniform Si grains (e.g., 10-15 nm) inside was fabricated. In one or more examples, an anode comprising the resulting Si@SiOx structure exhibited enhanced electrochemical performance including Coulombic efficiencies (initial Coulombic efficiency and Coulombic efficiencies over cycling), cycling stability, and rate capability even without a carbon-coating modification.

First Example Composition (Note: Figures denoted with a prefix S are found in appendix B of the priority application U.S. Provisional Application Ser. No. 63/247,647)

OS-Si@$SiO_x$ (sample produced by one-step reduction process) and MS-Si@$SiO_x$ were reduced from the ball-milled borosilicate with the size of 0.5-2 μm as shown in FIG. S1. FIG. 1 shows the morphologies of the synthesized OS-Si@$SiO_x$ and MS-Si@$SiO_x$. As shown in SEM images (FIGS. 1*a* and *b*), OS-Si@$SiO_x$ and MS-Si@$SiO_x$ both remain the particle size as their precursor and do not show obvious pulverization. Pulverization from the micron-size particle to the nanoparticle would lower the tap density but can be prevented in this work by using the partial reduction. FIG. S2 shows the powder appearance of the borosilicate precursor and the reduced products, indicating the tap densities of OS-Si@$SiO_x$ (0.73 g $cm^{-3}$) and MS-Si@$SiO_x$ (0.72 g $cm^{-3}$) do not reduce much compared with their precursor (0.88 g $cm^{-3}$ ).

TEM images in higher resolution (FIGS. 1*c* and *d*) show many morphology differences between OS-Si@$SiO_x$ and MS-Si@$SiO_x$ by revealing more morphology information inside the particles. FIG. 1*c* indicates that the primary particles in OS-Si@$SiO_x$ are made up of the secondary particles. The sizes of secondary particles in OS-Si@$SiO_x$ have an uneven distribution from 10 to 100 nm. Compared with OS-Si@$SiO_x$, MS-Si@$SiO_x$ has a much more uniform secondary particle size within the range 10-15 nm.

Figures 2A, 2B:
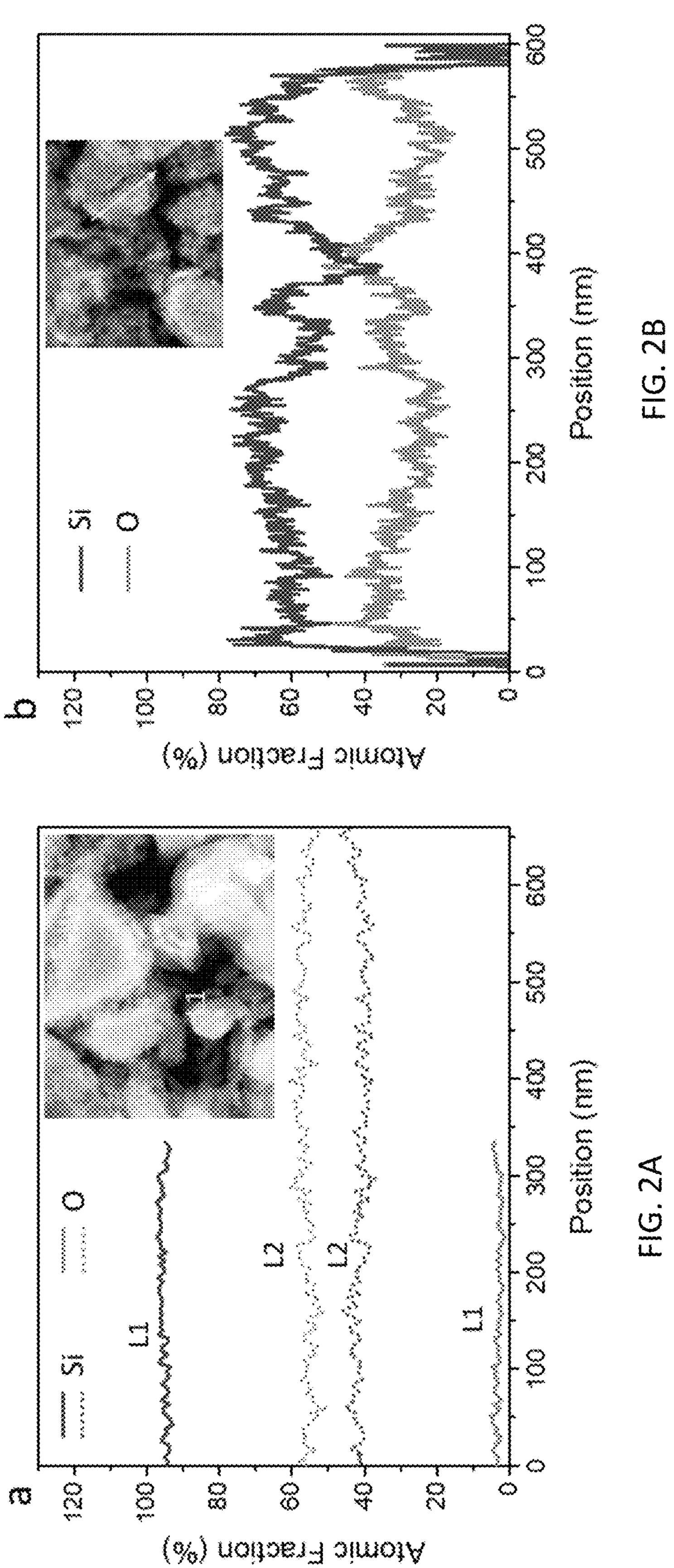

In order to study the structure and composition of the interior of the primary Si@$SiO_x$ particles, focus-ion beam (FIB) was used to cut the primary particles as shown in FIG. S3. The inset STEM image in FIG. 2*a* was obtained by using the dark field Z contrast mode which is known to be able to reflect the distribution of elementals.[34,35] The obvious bright contrast between the particles indicates the inhomogeneity of the magnesiothermic reduction for OS-Si@$SiO_x$. The line-scan elemental analysis along the arrow L1 shows that the silicon content across the particle is stable at around 95 at %. Considering the surficial oxidation of the Si, it can be concluded that the particle labeled by L1 was totally reduced to Si metal. The nearly triangular particle labeled by L2 shows a similar but smaller triangle highlighted by its lower brightness, which indicated the particle was the one cut by FIB considering that the reduction always happens from the outside in, and lower brightness means the lower silicon content (or "less reduction"). The line-scan elemental analysis along the arrow L2 shows that the silicon content stably maintains at around 40 at % which is much lower than the silicon content from the ICP result (Si/O=1.85). Over-reduction of one borosilicate particle means short-reduction of another one, considering that limited magnesium was used in the partial reduction. For the sample MS-Si@$SiO_x$, the STEM dark-field Z contrast image in FIG. 2*b* indicates that the magnesiothermic reduction is so homogeneous that we cannot even tell which particle is the cut one in a large field of view as shown in FIG. S4. The line-scan elemental analysis along the arrow in FIG. 2*b* shows that silicon content across the particle is around 60 at %, which is close to the ICP result (Si/O=1.75) and implies the homogeneous reduction throughout all the particles.

Figure 3:
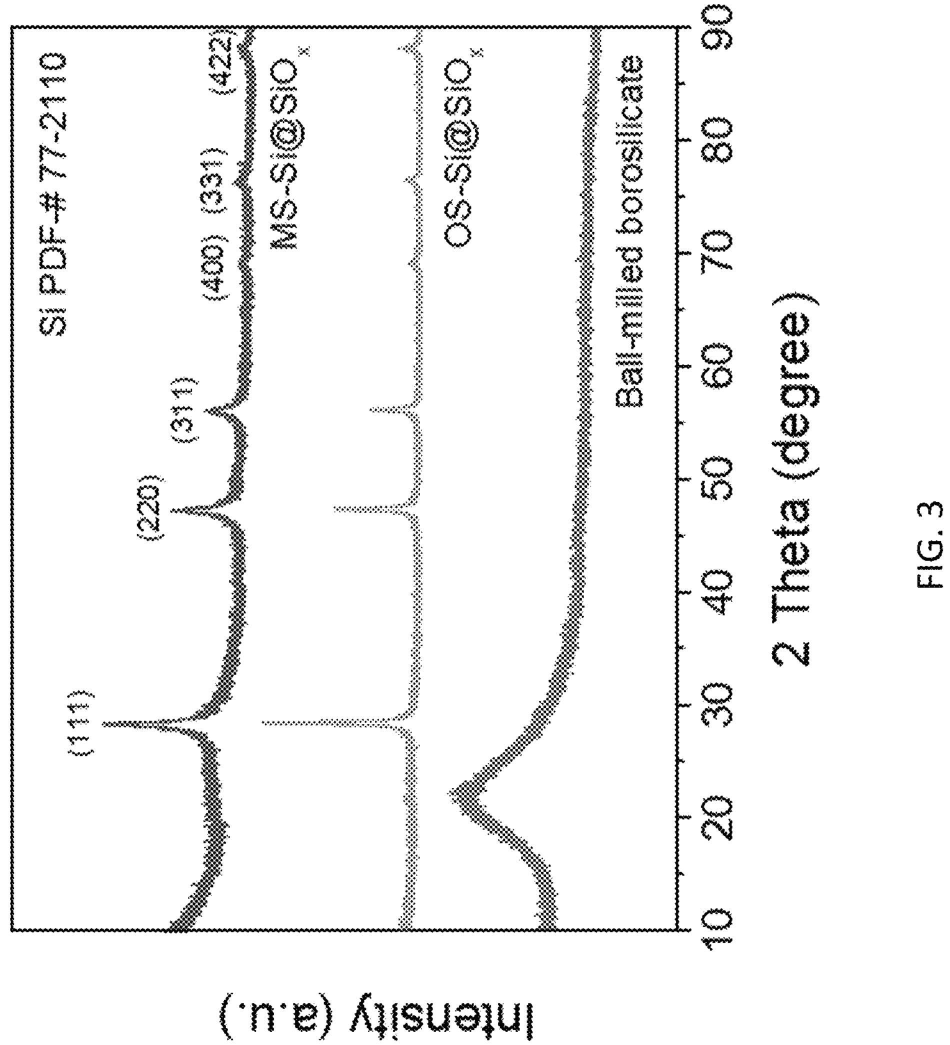
FIG. 3. XRD patterns of the ball-milled borosilicate, OS-Si@$SiO_x$, and MS-si@$SiO_x$.

X-ray powder diffraction was carried out to study the macroscopic properties (composition, crystalline structure, and average Si grain size) of the reduced products. As shown in FIG. 3, the amorphous borosilicate can evolve well into crystalline Si metal after the magnesiothermic reduction. Moreover, it is noticeable that all the diffraction peaks of MS-Si@$SiO_x$ are wider than those of OS-Si@$SiO_x$. For the X-ray powder diffraction, the width of the diffraction peaks in the XRD pattern reflects average crystallite size in the powder sample and can be quantified by the Scherrer equation as:[36,37]

$$L = \frac{K\lambda}{\beta\cos\theta}$$

where L is the average crystallite size in nanometer, K is a constant related to crystallite shape, normally taken as 0.9, λ is the X-ray wavelength (Cu-Kα, 0.15418 nm) in nanometer, β is the peak width of the diffraction peak at half maximum height and the value of β in 2θ axis of diffraction profile is in radians.

The values of β (peak FWHM) were measured with the Jade software as shown in FIG. S5. The three main diffraction peaks in each pattern were used for calculating the crystallite size as shown in Table S2. As a result, the average size of the Si grains of MS-Si@$SiO_x$ is calculated to be 11.11 nm, which is much smaller than that of OS-Si@$SiO_x$ (24.66 nm).

STEM and XRD on both the micro and the macro scale, respectively, confirmed the superior structure of small and uniform Si grains in MS-Si@$SiO_x$. Compared with OS-Si@$SiO_x$, the smaller and more uniform Si grains in MS-Si@$SiO_x$ just results from the limited usage of magnesium in each stage of the multi-stage magnesiothermic reduction. The reaction during the magnesiothermic reduction is known to be:[27]

$$SiO_2\,(s)+2Mg(g)\rightarrow Si(s)+2MgO(s)\,\Delta G(680^\circ\,C.)=-245.2\ kJ\ mol^{-1}$$

Magnesiothermic reduction is an exothermic reaction and would proceed under a positive-feedback mechanism where the reduction releases heat and the released heat, in turn, accelerates the reduction by increasing the reaction kinetics.[29] The different reaction kinetics can result in different structures, including the Si grain size and size distribution in the products.[28]

Figures 4A, 4B, 4C, 4D:
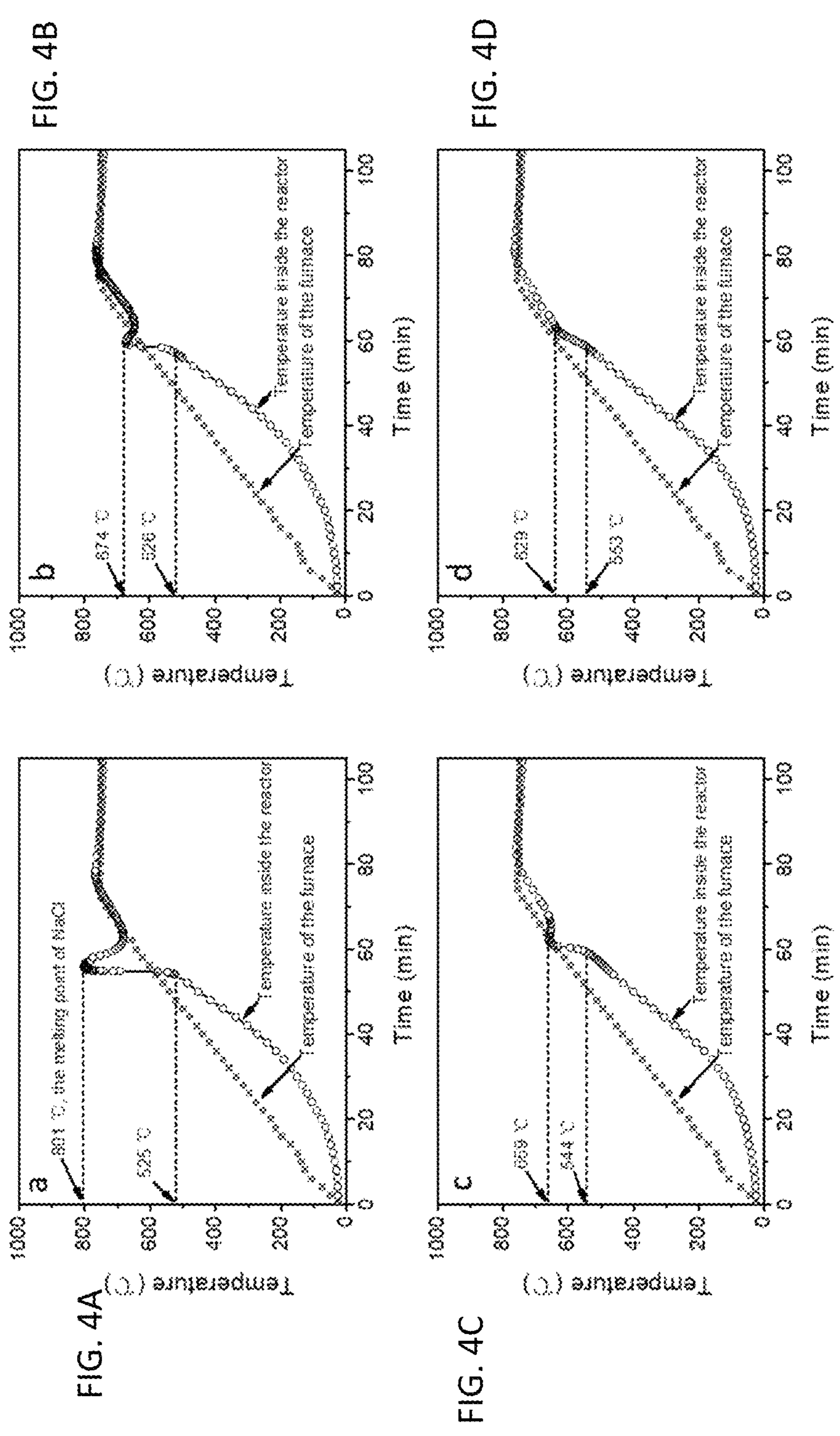
FIGS. 4A-4D. The in situ temperature profiles of (FIG. 4A) one-step magnesiothermic reduction, and (FIG. 4B) the first stage, (FIG. 4C) the second stage, and (FIG. 4D) the third stage of the multi-stage magnesiothermic reduction.

In order to study the different reaction kinetics, which can be indicated by the temperature change of the reaction system between the one-step and multi-stage magnesiothermic reduction, a new method of in situ measuring the temperature of the magnesiothermic reduction was developed as shown in FIG. S6. As shown in FIG. 4, the temperature inside the reactor is quite different from that of the furnace and is the real-time temperature of the reaction system, which was measured by burying a thermocouple in the reactant sealed in the reactor. FIG. 4*a* reveals that the reaction of the one-step magnesiothermic reduction was triggered at 525° C. as followed by an almost vertically rise in temperature inside the reactor. The rising temperature was stopped at 801° C., which is the exact melting point of NaCl and indicates good accuracy of the in-situ temperature measurement of the reaction system. The temperature of the one-step magnesiothermic reduction was maintained at 801° C. for 27 seconds, during which NaCl was melting.

For the multi-stage magnesiothermic reduction, the trigger temperature in the first stage, as shown in FIG. 4*b*, is almost the same as in the one-step magnesiothermic reduction, but the released heat in the first stage only heat the reaction system to 674° C., which is much lower than that in the one-step magnesiothermic reduction. In the second stage and the third stage, the released heats are even lower than that in the first stage as shown in FIGS. 4*c* and *d*. In FIG. 4, it can be concluded that the multi-stage magnesiothermic reduction with limited usage of magnesium in each stage can weaken the positive-feedback effect during the exothermic reaction by the distribution of the released heat into each stage, and thus reduces the reaction kinetics of the reduction and results in smaller Si grain with uniform size. The in-situ temperature measurement in this work demonstrates a new method for exploring the kinetics of the magnesiothermic reduction.

X-ray photoelectron spectroscopy measurements were carried out to further investigate the elemental composition and the valence states of the silicon at the surface of OS-Si@$SiO_x$ and MS-Si@$SiO_x$. The survey spectra in FIGS. 5*a* and *c* indicate the existence of the O, Si, B, Mg, and Na (binding energies and contents listed in Table S3) in OS-Si@$SiO_x$ and MS-Si@$SiO_x$, respectively. Elemental analysis based on the survey spectra shows that both the contents of Mg and Na are lower than 1 at % in OS-Si@$SiO_x$ and MS-Si@$SiO_x$ as shown in Table S3. The Mg in the products could be introduced by the magnesiothermic reduction, while the Na (0.56-0.66 at %) in the products can be residual of the borosilicate precursor and should not be introduced by the usage of NaCl in the magnesiothermic reduction, considering no obvious characteristic photoelectron was detected for the chlorine with the binding energy (Cl 2p) at around 197 eV in the products. Moreover, as shown in Table S3 and S5, the Na contents of the products measured by ICP (0.76-0.78 at %) and XPS (0.56-0.66 at %) are close to each other, which indicates the homogenous reduction throughout each particle of the borosilicate precursor (ICP result, 2.45 at % for Na content). The homogenous reduction could result from the relatively low viscosity of the borosilicate (109.1 Pa·s vs. $10^{>16}$ Pa·s for pure silica glass at 750° C.) by facilitating solid-phase mass diffusion during the magnesiothermic reduction.[31] It is noticeable that products etched by HCl keep higher boron contents (11.25-11.31 at %) than the borosilicate precursor (7.08 at %) as shown in Table S3, indicating the boron exists in the products as doping. Boron doping has been reported to improve the electrochemistry of the silicon-based anode by increasing the electroconductivity and facilitating the lithium-ion diffusion.[32,33,38,39]

Figure 5E:
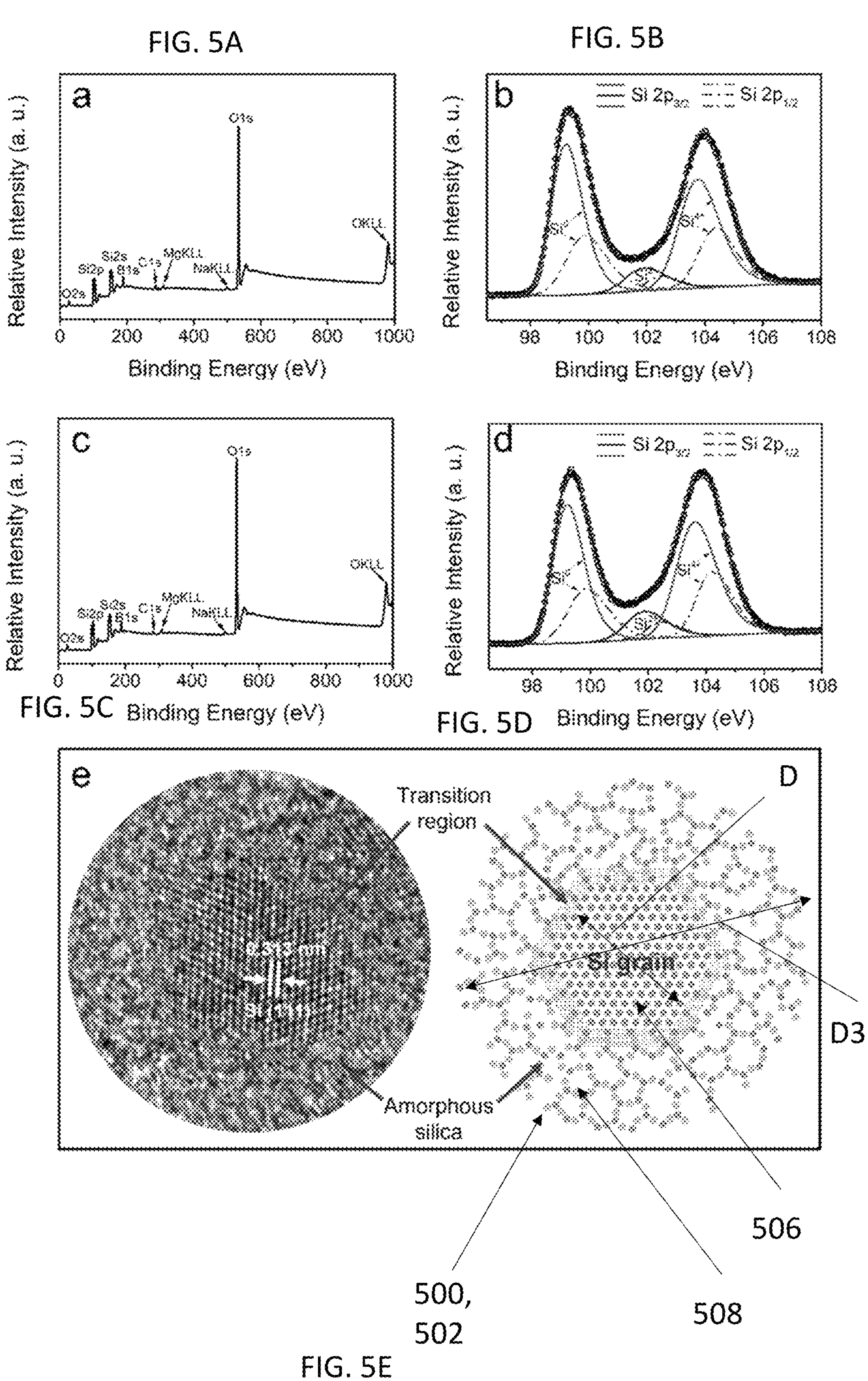

In order to investigate the valence stage of the Si in OS-Si@$SiO_x$ and MS-Si@$SiO_x$, the assignment of the Si 2p peak was performed. As shown in FIGS. 5*b* and *d*, the fitted data by the assignment of $Si^0$, $Si^{2+}$, and $Si^{4+}$ is internally quite consistent with the observed photoemission features of the Si 2p. Table S6 shows the peak assignment of Si 2p of OS-Si@$SiO_x$ and MS-Si@$SiO_x$. The $Si^{2+}$ could exist in the transition region between Si metal and silica, where the four valence electrons of the $Si^{2+}$ statistically fifty-fifty bonds with silicon and oxygen as illustrated in FIG. 5*e*. This illustration explains the higher $Si^{2+}$ content in MS-Si@$SiO_x$ (11.13 at % vs. 9.18 at % for OS-Si@$SiO_x$) which has smaller Si grains and thus the more transition regions than OS-Si@$SiO_x$. The transition regions can integrate the Si grains and the amorphous silica matrix and act as good stress-buffer layers to alleviate the stress caused by the volume change of Si grains during the charging/discharging cycles. The continuous structure can avoid the direct exposure of the Si grains to the electrolyte, and thus can reduce the irreversible lithium caused by the formation of the solid electrolyte interface (SEI) on the surface of the active materials and improve the Coulombic efficiencies (including the initial Coulombic efficiency and Coulombic efficiencies over cycling) of the anode materials.

Figures 5F, 5G, 5H, 5I, 5J:
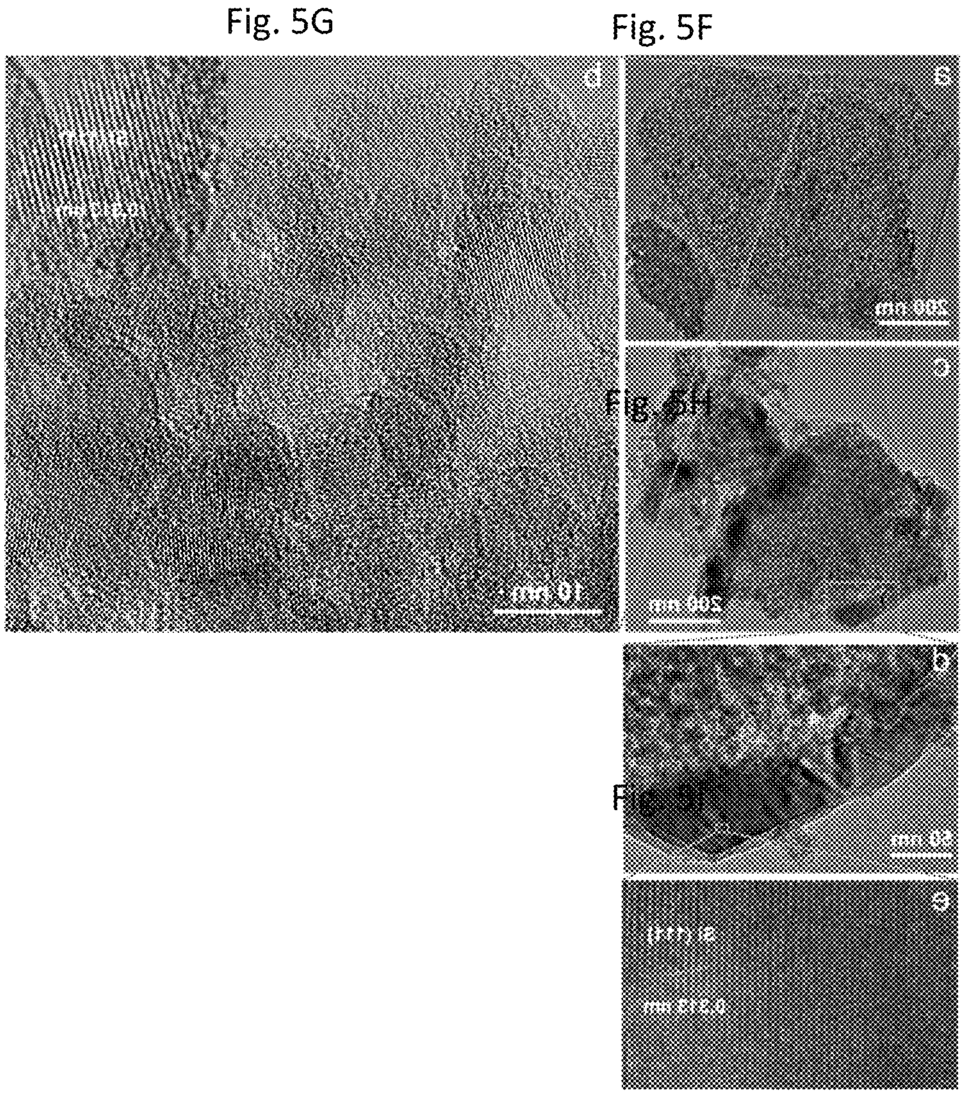

More morphology details of nanoscale structures of OS-Si@$SiO_x$ and MS-Si@$SiO_x$ were investigated by using HRTEM. The domains with lattice fringes in FIG. 5G signify the crystalline nature of silicon grains in MS-Si@$SiO_x$. It is noticeable that the silicon grains in MS-Si@$SiO_x$ are uniform in a large scope of vision. The average size of the silicon grains was measured to be 9.3 nm. The HRTEM images in FIG. 5J indicate that the large domains with sizes greater than 100 nm in TEM images of OS-Si@$SiO_x$ (also shown in FIG. 1*c*, FIGS. 5H and 5I) are most likely silicon metal.

Second Example: Electrochemical Performance of the First Example

Figures 6A, 6B, 6C, 6D, 6E:
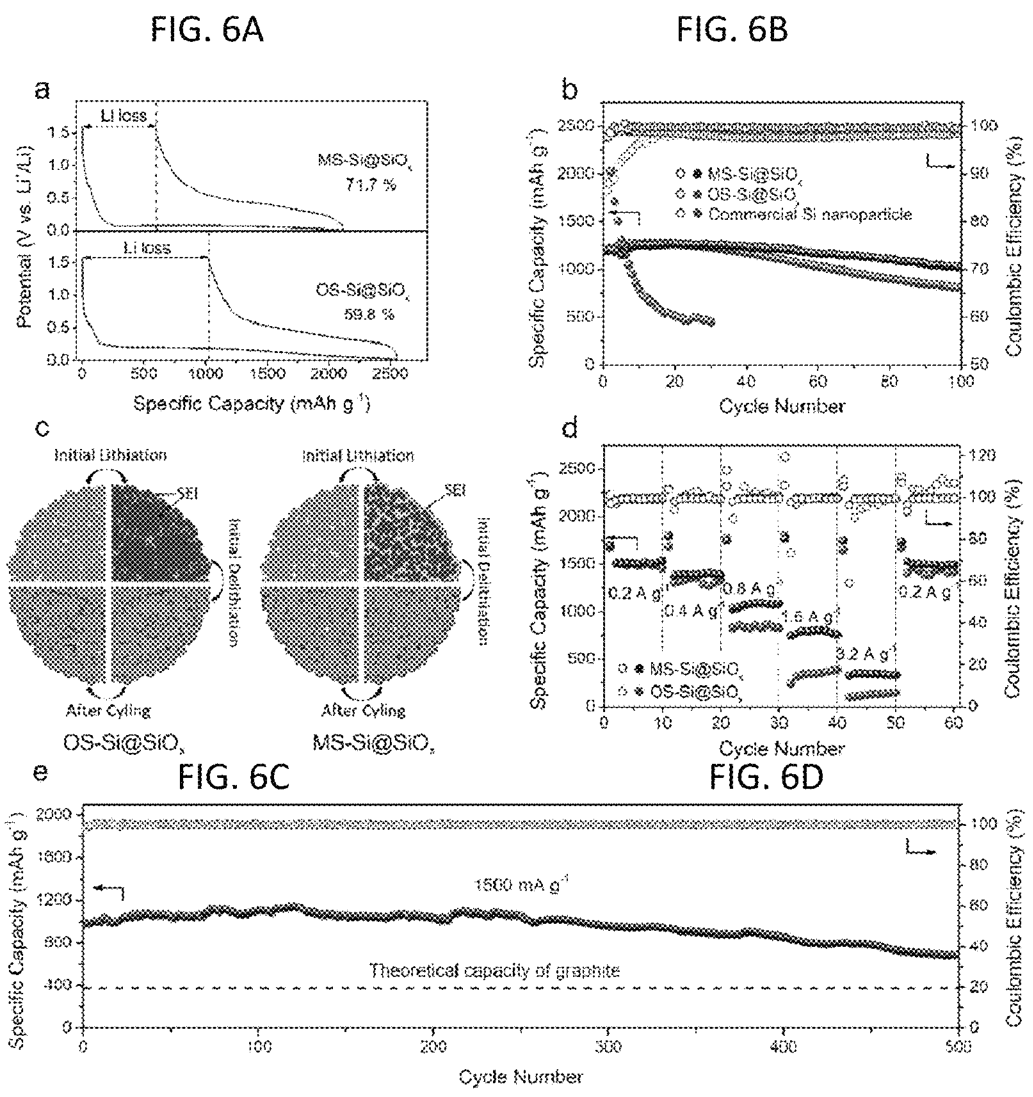
FIGS. 6A-6E. Electrochemical performances of MS-Si@$SiO_x$ and OS-Si@$SiO_x$ in half-cell configuration.

The electrochemical performances of MS-Si@$SiO_x$ and OS-Si@ $SiO_x$ were first demonstrated in the half-cell configuration in which lithium metal was used as the counter electrode (FIG. 6). FIG. 1*a* shows the initial discharge/charge profiles of MS-Si@$SiO_x$ and OS-Si@$SiO_x$ at 200 mA $g^{-1}$. With the cut-off voltage range of 0.01-1.5 V, MS-Si@$SiO_x$ delivered a reversible capacity of 1549.7 mAh $g^{-1}$ in the first cycle, and that for OS-Si@$SiO_x$ is 1485.9 mAh $g^{-1}$. More important, MS-Si@$SiO_x$ (71.7%) achieved much higher ICE than OS-Si@$SiO_x$ (59.8%). The ICE is a crucial parameter for the evaluation of the anode materials,[40] especially for silicon-based anodes.[41,42] The improvement of the ICE would benefit the construction of the full cell in practical application because good ICE reduces an excess amount of cathode material solely for the first cycle, resulting in an increased total energy density.[40] The improved ICE of MS-Si@$SiO_x$ could result from the presence of the smaller and evenly distributed Si grains in the $SiO_x$ matrix. The $SiO_x$ matrix as illustrated in FIG. 5*e* prevents the direct exposure of the Si grains to the electrolyte, and thus reduces the formation of the SEI. Moreover, smaller Si grains of MS-Si@$SiO_x$ would suffer less stress of the volume change during the initial lithiation so that they have less chance to form micro-cracks as the bigger Si grains of OS-Si@$SiO_x$ do as illustrated in FIG. 6*c*. The micro-cracks as the new surfaces will consume lithium to form the extra SEI and thus lower the ICE.

The cycling stabilities of MS-Si@$SiO_x$ and OS-Si@$SiO_x$ were investigated by galvanostatic charging/discharging at 500 mA $g^{-1}$ in 0.01-1.5 V. For comparison, half cell with the commercial Si nanoparticle (15 nm) as an anode was also fabricated and tested under the same conditions. As shown in FIG. 6*b*, the synthesized Si@$SiO_x$ composite materials have much better cycling stability than the pure Si nanoparticle, though the pure Si nanoparticle delivers higher capacity at the initial stage of cycling. The improved cycling stability of the synthesized Si@$SiO_x$ composite materials results from the protection of the $SiO_x$ matrix.

The $SiO_x$ matrix with mesoporous structure (~25 nm) in MS-Si@$SiO_x$ (indicated by the nitrogen physisorption result in FIG. S7) is also beneficial for stability. The mesopores were created by etching the by-product MgO that remained in the $SiO_x$ matrix after the magnesiothermic reduction. The $SiO_x$ matrix with its mesoporous structure can relieve the volume change of the active material as effectively as the lung in a way similar to breathing during the charging/discharging cycling. While the pure Si nanoparticles without the protection of the inactive matrix are more likely to lose contact with the current collector on which the silicon nanoparticle is fixed only by the binder, and become the dead mass, resulting in the cliff-type capacity decay of the cell as shown in FIG. 6*b* and highlighting the importance of the $SiO_x$ matrix in preventing the pulverization of the electrode.

FIG. 6*b* shows that MS-Si@$SiO_x$ delivers a reversible capacity of 1020.1 mAh $g^{-1}$ after 100 cycles with a capacity retention of 85.1%, while OS-Si@$SiO_x$ delivers a capacity of 810.2 mAh $g^{-1}$ with a capacity retention of 67.8%. The improved cycling stability of MS-Si@$SiO_x$ can result from its superior structure of the smaller and more uniform Si grains. It is worthy to note that MS-Si@$SiO_x$ (99.68% on average) shows higher Coulombic efficiencies over the 100 cycles than OS-Si@$SiO_x$ (98.14% on average). As illustrated in FIG. 6*c*, the inferior Coulombic efficiencies of OS-Si@$SiO_x$ could result from the continuous fracture of the big Si grains over the cycling. The continuous fracture keeps the formation of new surfaces where the new SEI forms, and thus leads to the poor Coulombic efficiencies (<99%), which highlights the importance of the superior structure of MS-Si@$SiO_x$ in improving the Coulombic efficiency. For long-term cycling (FIG. 6E), MS-Si@$SiO_x$ showed remarkable cycling stability and exhibited a reversible capacity of 686.9 mAh at 1500 mA $g^{-1}$ after 500 cycles with a capacity retention of 70.9%.

Rate performance is also important for the practical application of LIBs. FIG. 6*d* shows the reversible capacities of MS-Si@$SiO_x$ and OS-Si@$SiO_x$ at different current densities (Charge/discharge profiles shown in FIG. S8). MS-Si@$SiO_x$ presents superior capacities compared with OS-Si@$SiO_x$ at the high current densities (>800 mA $g^{-1}$). The smaller Si grains could endow the higher power of MS-Si@$SiO_x$ by shortening the diffusion path of the bulk electrochemistry.

Third Example: Full Cell Comprising the Composition of the First Example

In order to investigate the practical use of the as-prepared Si@$SiO_x$ anode materials, full cells were constructed with the MS-Si@$SiO_x$ and OS-Si@$SiO_x$ as the anodes and the commercial $LiFePO_4$ as the cathode (charge/discharge profiles in half-cell configuration shown in FIG. S9). Notably, $LiFePO_4$, with the high theoretical capacity (171 mAh $g^{-1}$) and excellent thermal stability, is one of the most successful cathode materials in the LIB market.

Swagelok-type cells with three electrodes (the cathode, the anode, and the reference electrode) were constructed to study the effect of the initial Coulombic efficiency of the anodes on the performance of the full cell. The three-electrode cell can be used not only to demonstrate the performance of the full cell, but to tell the working details of each electrode as well as the coordination between each other by simultaneously collecting the data of the full-cell voltage, the cathode potential, and the anode potential. In the charging process, $Li^+$ as the charge carrier of the internal circuit extracts from the cathode ($LiFePO_4$) to the anode (Si@$SiO_x$). With the extraction of $Li^+$ from the cathode microstructure, cathode potential (vs. $Li^+$/Li) increases and the opposite occurs for the anode as its microstructure is continually filled with lithium by coupling the $Li^+$ with the electron from the external circuit. During discharge, the reverse situation occurs. These changes can be reflected in the three-electrode potential profiles as shown in FIG. 7*a*, which is not possible to be seen when using a two-electrode setup.

Figure 7B:
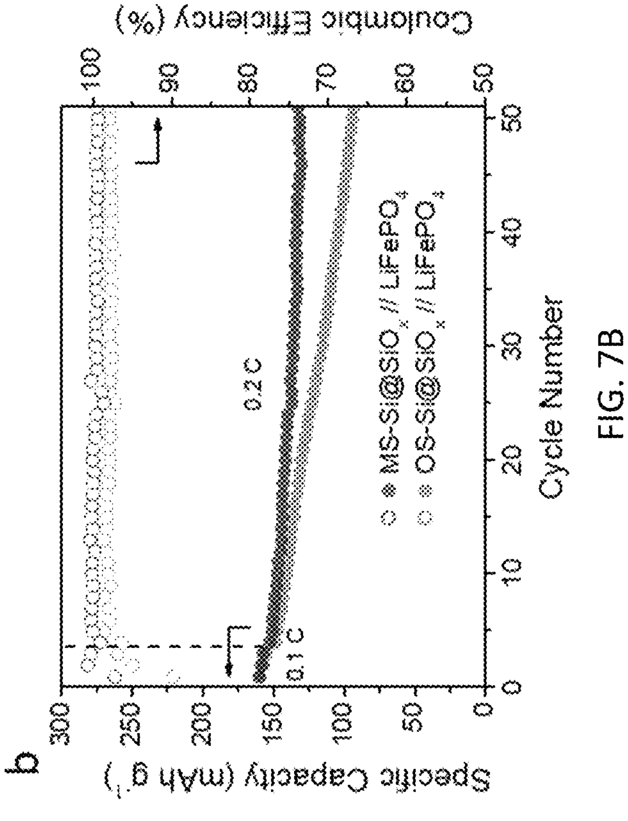
FIGS. 7A-7B. Electrochemical performances of MS-Si@$SiO_x$ and OS-Si@$SiO_x$ in full-cell configuration.
Figure 7A:
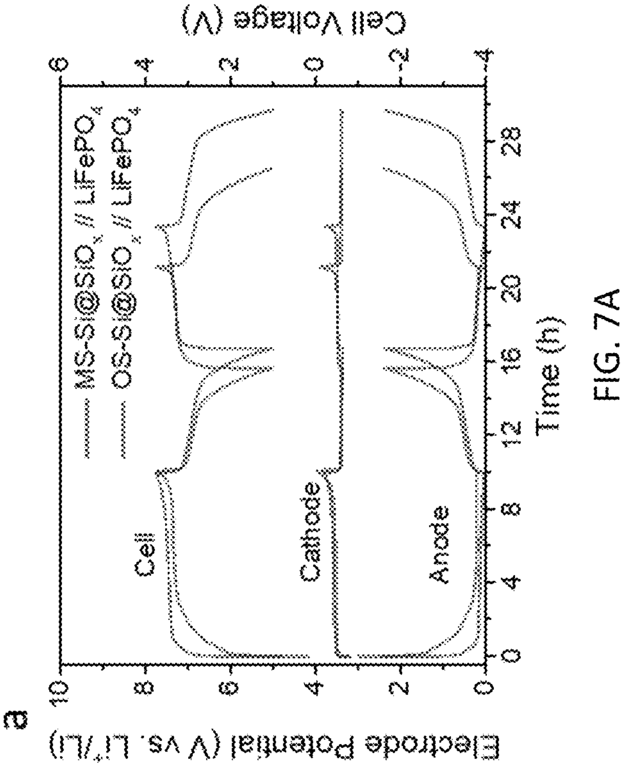

As indicated in FIG. 7*a*, MS-Si@$SiO_x$//$LiFePO_4$ delivers a reversible discharge capacity of 114.7 mAh $g^{-1}$ (114.7 mAh $g^{-1}$=6.747 h×17 mA $g^{-1}$, capacity based on the $LiFePO_4$ mass) in the first cycle, while OS-Si@$SiO_x$//$LiFePO_4$ delivers a lower one (94.6 mAh $g^{-1}$). From the three-electrode-cell demonstration, it is clear that the higher discharge capacity of MS-Si@$SiO_x$//$LiFePO_4$ derives from the higher initial Coulombic efficiency of the anode. In the first cycle, both cathodes in MS-Si@$SiO_x$//$LiFePO_4$ and OS-Si@$SiO_x$//$LiFePO_4$ delivered the same charge capacity, or in another word, the same amount of $Li^+$ was extracted from both cathodes. At the same time, the same amount of $Li^+$ was fixed in the anodes including intercalation (reversible Li+) and formation of the SEI (irreversible $Li^+$). In the discharge process of the first cycle, both cathodes of MS-Si@$SiO_x$//$LiFePO_4$ and OS-Si@$SiO_x$//$LiFePO_4$ keep their potentials stably at 3.4 V vs. $Li^+$/Li till the end of the discharge. For the full cells, the terminations of the discharge with the cut-off voltage of 3.75 V result from the rapid rise of the anode potentials when the reversible $Li^+$ is running out in the anodes. From the three-electrode-cell demonstration, it can be concluded that the reversible discharge capacities of MS-Si@$SiO_x$//$LiFePO_4$ and OS-Si@$SiO_x$//$LiFePO_4$ in the first cycle are directly determined by the ICEs of the anodes. Duo to the higher ICE of MS-Si@$SiO_x$, MS-Si@$SiO_x$//$LiFePO_4$ delivered the higher reversible capacity in the first cycle. Because the lithium is provided only by cathode in the full cell, the amount of the reversible $Li^+$ that is achieved in the first cycle will be converted equally as the maximum of the reversible capacity in the following cycles. As a result, in the second cycle, MS-Si@$SiO_x$//$LiFePO_4$ delivered a reversible capacity of 107.3 mAh $g^{-1}$ (107.3 mAh $g^{-1}$=6.31 h×17 mA $g^{-1}$), which is still higher than that of OS-Si@$SiO_x$//$LiFePO_4$ (90.6 mAh $g^{-1}$=5.327 h×17 mA $g^{-1}$) as a matter of course.

In the half cell configuration, pulverization deactivation of the anode materials could simply be regarded as the only main factor that results in the capacity decay of the cell. For the full-cell configuration, in addition to the pulverization deactivation, the Coulombic efficiencies over the cycling of the anodes are also very important to the cycling stability because the shuttling $Li^+$ between the cathode and anode is originally provided by the cathode and, unlike in the half cell, is always limited. The continuous formation of new SEI brings low Coulombic efficiencies over the cycling by the continuous consumption of the reversible $Li^+$and thus aggravates the capacity decay of the full cell. From this point of view, MS-Si@$SiO_x$ with the higher Coulombic efficiencies over the cycling is more advantageous to improve the cycling stability of the full cell.

Coin-type full cells were constructed to investigate the cycling stabilities of MS-Si@$SiO_x$//$LiFePO_4$ and OS-Si@$SiO_x$//$LiFePO_4$. As shown in FIG. 7*b*, the MS-Si@$SiO_x$//$LiFePO_4$ delivers a reversible capacity of 131.8 mAh $g^{-1}$ at 0.2 C (1 C=170 mA $g^{-1}$) with a capacity retention of 86.48% after 50 cycles (charge/discharge profiles over the cycles shown in FIG. S10), while OS-Si@$SiO_x$//$LiFePO_4$ delivers a lower reversible capacity of 92.1 mAh $g^{-1}$ at 2 C with a capacity retention of 62.1% after 50 cycles (charge/discharge profiles over the cycles shown in FIG. S11), highlighting the importance of the Coulombic efficiency on the cycling stability of the full cell.

Hierarchical Si@$SiO_x$ nanostructures that nano-sized Si grains embedded in $SiO_x$ matrix with mesopores were successfully achieved by using low-cost borosilicate as precursor through a simple magnesiothermic reduction. We developed a multi-stage magnesiothermic reduction that could reduce the Si grain size and avoid the formation of big silicon domains in MS-Si@$SiO_x$. The method of in situ temperature measurement of the magnesiothermic reduction was first used to study the reaction kinetics and worked very efficiently. With the in-situ method, it was found that multi-stage magnesiothermic reduction with limited usage of magnesium in each stage was able to weaken the positive-feedback effect during the exothermic reaction by the distribution of the released heat into each stage, and thus reduced the reaction kinetics of the reduction and resulted in Si grains with smaller and more uniform size. MS-Si@$SiO_x$ synthesized by multi-stage magnesiothermic reduction showed enhanced electrochemical performance as a lithium-ion battery anode in terms of Coulombic efficiencies (initial Coulombic efficiency and Coulombic efficiencies over cycling) and cycling stability and rate capability. Three-electrode full cells were constructed and demonstrated that the improved initial Coulombic efficiency of MS-Si@ $SiO_x$ favored the capability of the full cell to a great extent. In the full-cell configuration, MS-Si@$SiO_x$//$LiFePO_4$ showed significant improvements in cycling stability, which highlights the practical application of the anode material synthesized by the multi-stage magnesiothermic reduction. We believed that the multi-stage magnesiothermic reduction will inspire other efforts in the optimization of the magnesiothermic-reduction derived nanostructures.

REFERENCES FOR EXAMPLES 1-3

(1) Chae, S.; Choi, S. H.; Kim, N.; Sung, J.; Cho, *J. Angewandte Chemie-International Edition* 2020, 59, 110.

(2) Tao, W.; Wang, P.; You, Y.; Park, K.; Wang, C. Y.; Li, Y. K.; Cao, F. F.; Xin, S. *Nano Research* 2019, 12, 1739.

(3) Liu, N.; Lu, Z.; Zhao, J.; McDowell, M. T.; Lee, H. W.; Zhao, W.; Cui, Y. *Nat Nanotechnol* 2014, 9, 187.

(4) Feng, K.; Li, M.; Liu, W. W.; Kashkooli, A. G.; Xiao, X. C.; Cai, M.; Chen, Z. W. *Small* 2018, 14.

(5) Li, P.; Zhao, G. Q.; Zheng, X. B.; Xu, X.; Yao, C. H.; Sun, W. P.; Dou, S. X. *Energy Storage Materials* 2018, 15, 422.

(6) Li, P.; Kim, H.; Myung, S. T.; Sun, Y. K. *Energy Storage Materials* 2021, 35, 550.

(7) Ge, M.; Cao, C.; Biesold, G. M.; Sewell, C. D.; Hao, S. M.; Huang, J.; Zhang, W.; Lai, Y.; Lin, Z. *Adv Mater* 2021, e2004577.

(8) Liu, Z. H.; Yu, Q.; Zhao, Y. L.; He, R. H.; Xu, M.; Feng, S. H.; Li, S. D.; Zhou, L.; Mai, L. Q. *Chemical Society Reviews* 2019, 48, 285.

(9) Jia, H. P.; Li, X. L.; Song, J. H.; Zhang, X.; Luo, L. L.; He, Y.; Li, B. S.; Cai, Y.; Hu, S. Y.; Xiao, X. C.; Wang, C. M.; Rosso, K. M.; Yi, R.; Patel, R.; Zhang, J. G. *Nature Communications* 2020, 11.

(10) Kim, J.; Chae, O. B.; Lucht, B. L. *Journal of the Electrochemical Society* 2021, 168.

(11) Wu, H.; Chan, G.; Choi, J. W.; Ryu, I.; Yao, Y.; McDowell, M. T.; Lee, S. W.; Jackson, A.; Yang, Y.; Hu, L.; Cui, Y. *Nat Nanotechnol* 2012, 7, 310.

(12) Liu, Q.; Cui, Z.; Zou, R.; Zhang, J.; Xu, K.; Hu, J. *Small* 2017, 13.

(13) Li, W.; Li, Z.; Kang, W.; Tang, Y.; Zhang, Z.; Yang, X.; Xue, H.; Lee, C.-S. *Journal of Materials Chemistry* A 2014, 2, 12289.

(14) Chen, Y.; Lin, Y.; Du, N.; Zhang, Y.; Zhang, H.; Yang, D. *Chemical Communications* 2017, 53, 6101.

(15) Su, L.; Zhou, Z.; Ren, M. *Chemical Communications* 2010, 46, 2590.

(16) Su, J.; Zhao, J.; Li, L.; Zhang, C.; Chen, C.; Huang, T.; Yu, A. *Acs Applied Materials & Interfaces* 2017, 9, 17807.

(17) Zhou, J.; Lin, N.; Han, Y.; Zhou, J.; Zhu, Y.; Du, J.; Qian, Y. *Nanoscale* 2015, 7, 15075.

(18) Hou, S. C.; Chen, T. Y.; Wu, Y. H.; Chen, H. Y.; Lin, X. D.; Chen, Y. Q.; Huang, J. L.; Chang, C. C. *Scientific Reports* 2018, 8.

(19) Wen, Z.; Lu, G.; Cui, S.; Kim, H.; Ci, S.; Jiang, J.; Hurley, P. T.; Chen, J. *Nanoscale* 2014, 6, 342.

(20) Yang, Y.; Ren, J.-G.; Wang, X.; *Chui*, Y.-S.; Wu, Q.-H.; Chen, X.; Zhang, W. *Nanoscale* 2013, 5, 8689.

(21) Chen, Y.; Qian, J.; Cao, Y.; Yang, H.; Ai, X. *Acs Applied Materials & Interfaces* 2012, 4, 3753.

(22) Jia, H.; Stock, C.; Kloepsch, R.; He, X.; Badillo, J. P.; Fromm, O.; Vortmann, B.; Winter, M.; Placke, T. *Acs Applied Materials & Interfaces* 2015, 7, 1508.

(23) Zhou, D.; Jia, H. P.; Rana, J.; Placke, T.; Klopsch, R.; Schumacher, G.; Winter, M.; Banhart, *J. Journal of Power Sources* 2016, 324, 830.

(24) Zhang, P.; Wang, L.; Xie, J.; Su, L.; Ma, C.-a. *Journal of Materials Chemistry* A 2014, 2, 3776.

(25) Mu, G.; Ding, Z. P.; Mu, D. B.; Wu, B. R.; Bi, J. Y.; Zhang, L.; Yang, H.; Wu, H. F.; Wu, F. *Electrochimica Acta* 2019, 300, 341.

(26) Entwistle, J.; Rennie, A.; Patwardhan, S. *Journal of Materials Chemistry* A 2018, 6, 18344.

(27) Yoo, J.-K.; Kim, J.; Choi, M.-J.; Park, Y.-U.; Hong, J.; Baek, K. M.; Kang, K.; Jung, Y. S. *Advanced Energy Materials* 2014, 4.

(28) Curtis, I. S.; Wills, R. J.; Dasog, M. *Nanoscale* 2021, 13, 2685.

(29) Yan, Z.; Guo, J. *Nano Energy* 2019, 63, 103845.

(30) Li, C.; Liu, C.; Wang, W.; Mutlu, Z.; Bell, J.; Ahmed, K.; Ye, R.; Ozkan, M.; Ozkan, C. S. *Scientific Reports* 2017, 7.

(31) Doremus, R. H. *Journal of Applied Physics* 2002, 92, 7619.

(32) Woo, J.; Back, S.-H.; Park, J.-S.; Jeong, Y.-M.; Kim, J. H. *Journal of Power Sources* 2015, 299, 25.

(33) Han, X.; Zhang, Z.; Chen, H.; Luo, L.; Zhang, Q.; Chen, J.; Chen, S.; Yang, Y. *Journal of Materials Chemistry* A 2021, 9, 3628.

(34) J., P. S.; E., J. D. *Ultramicroscopy* 1991, 37.

(35) Pan, Y. H.; Sader, K.; Powell, J. J.; Bleloch, A.; Gass, M.; Trinick, J.; Warley, A.; Li, A.; Brydson, R.; Brown, A. *J Struct Biol* 2009, 166, 22.

(36) Muniz, F. T. L.; Miranda, M. A. R.; Morilla dos Santos, C.; Sasaki, J. M. *Acta Crystallographica* Section A: Foundations and Advances 2016, 72, 385.

(37) Drits, V.; Środoń, J.; Eberl, D. *Clays and clay minerals* 1997, 45, 461.

(38) Cho, S.; Jung, W.; Jung, G. Y.; Eom, K. *Journal of Power Sources* 2020, 454, 227931.

(39) Ren, Y.; Zhou, X.; Tang, J.; Ding, J.; Chen, S.; Zhang, J.; Hu, T.; Yang, X. S.; Wang, X.; Yang, *J. Inorg Chem* 2019, 58, 4592.

(40) Li, X.; Sun, X.; Hu, X.; Fan, F.; Cai, S.; Zheng, C.; Stucky, G. D. *Nano Energy* 2020, 77, 105143.

(41) Yang, M. Y.; Li, G.; Zhang, J.; Tian, Y. F.; Yin, Y. X.; Zhang, C. J.; Jiang, K. C.; Xu, Q.; Li, H. L.; Guo, Y. G. *Acs Applied Materials & Interfaces* 2020, 12, 27202.

(42) Li, Z. H.; Zhang, Y. P.; Liu, T. F.; Gao, X. H.; Li, S. Y.; Ling, M.; Liang, C. D.; Zheng, J. C.; Lin, Z. *Advanced Energy Materials* 2020, 10.

Fourth Example: How Heat Treatment Enhances the Initial Coulombic Efficiency of the Magnesiothermic-Reduced $SiO_x$ as Anode for Lithium-Ion Batteries (Note: Figures denoted with a prefix S are found in appendix D of the priority application U.S. Provisional Application Ser. No. 63/247,647)

As discussed above, magnesiothermic reduction has been considered as one of the most practical processes to obtain Si on a large scale,[23] the partial magnesiothermic reduction can be the most effective method to one-step fabricate nano-sized silicon grains embedded in the $SiO_x$ matrix. With this method, Si grains can be obtained via scavenging of oxygen from silica by Mg, and porous structures can be introduced in forms of template sacrifice (MgO etching) and/or microcracks caused by the thermal shock, considering the magnesiothermic reduction is an exothermal reaction. Even though the porous structures in Si@$SiO_x$ materials have been reported to improve the electrochemical performance by accommodating the volume change,[7,24-26] the enlarged specific surface area (SSA) by the porous structures induces an additional formation of the solid-electrolyte interface (SEI), which lowers the initial Coulombic efficiency (ICE) of the anode materials and discounts the practical application of the Si@ $SiO_x$ anode materials. To the best of our knowledge, the effect of porous structures (sizes and types) of the magnesiothermic-reduced Si@$SiO_x$ anode materials on the ICE has never been investigated.

In this example, we provided a fundamental investigation of the relationship between the ICE and the porous structures of the magnesiothermic-reduced Si@$SiO_x$ anode materials. Heat treatment was employed to change the porous structures. Low-cost borosilicate (~\$200 $t^{-1}$) was selected as the precursor, considering its advantages: (1) Borosilicate powder can be obtained without pre-leaching and annealing by directly milling the glass bottles which have always been disposed of as non-recycled glass ends up with landfills in many tons every year; (2) the remained boron as dopant can increases the electrical conductivity and the lithium-ion diffusion;[27,28] (3) the low softening temperature of the borosilicate (820° C. vs. 1670° C. for pure silica) can facilitate the transformation of the porous structures by heat treatment. In this work, we found: (1) The SSA of the magnesiothermic-reduced Si@$SiO_x$ can be reduced to a large extent (from 308 to 87 $m^2$ $g^{-1}$) by the heat treatment (850-1000° C.); (2) the nanopores smaller than 2.5 nm, namely the microcracks, contributes to the most of SSA and the heat treatment reduced the SSA by eliminating the microcracks selectively; (3) The elimination of the microcracks can improve the ICE (from 60.62% to 74.04%) of the Si@$SiO_x$ anode materials resulting from the reduction of the formation of SEI. Swagelok-type full cells with three electrodes were fabricated to quantify the enhanced energy density (from 294.2 to 362.5 Wh $kg^{-1}$ based on the $LiFePO_4$/C mass) in full-cell configuration benefited from the improved ICE of the anode, highlighting the significance of the ICE in the practical application of LIBs.

Figures 8A, 8B, 8C, 8D:
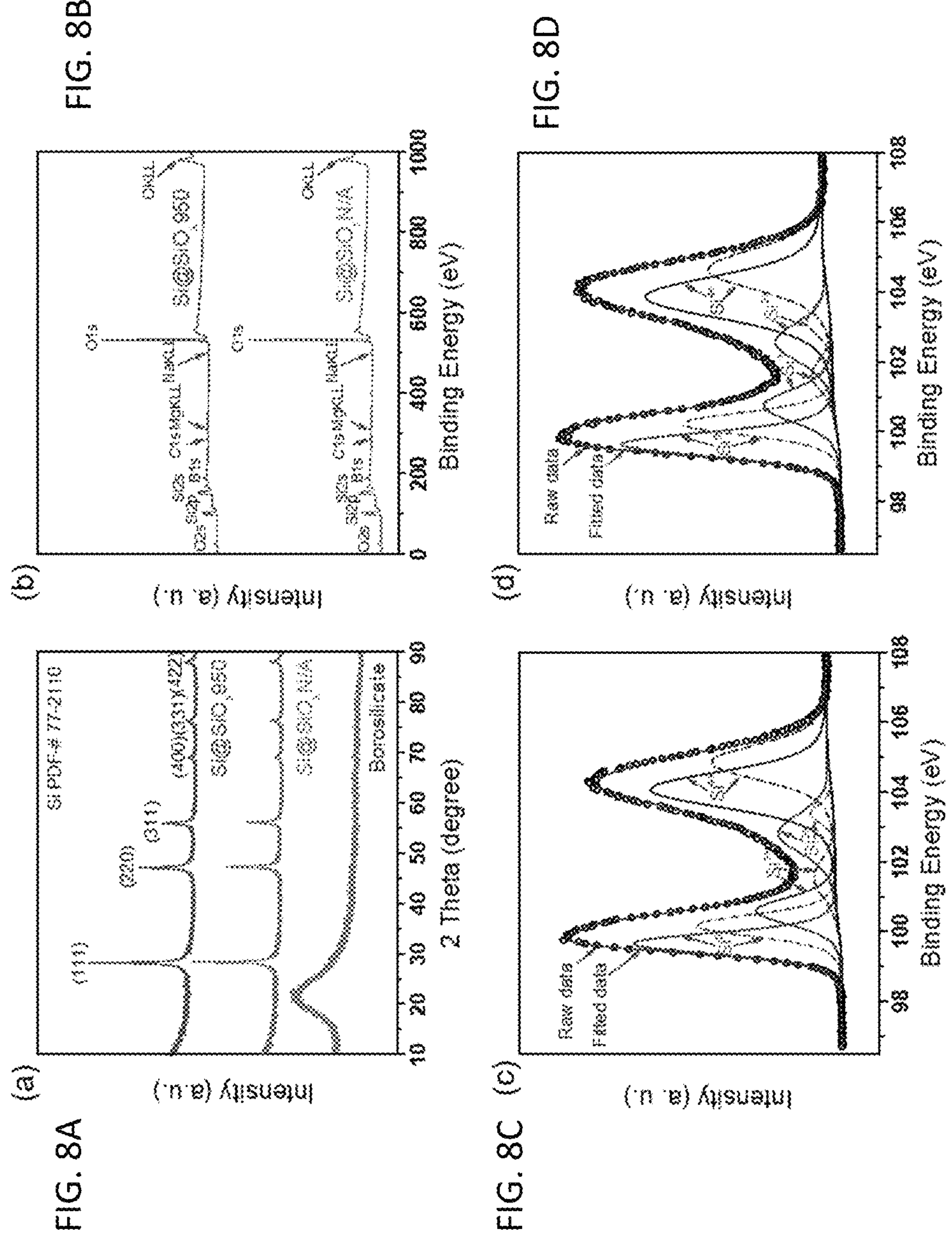
FIGS. 8A-8D.

The macroscopic properties including the phase component and the average Si grain size of the samples were analyzed by the X-ray powder diffraction. As shown in FIG. 8*a*, the amorphous borosilicate precursor was reduced to crystalline silicon metal by the magnesiothermic reduction, while the morphology of the primary structure did not change much after the reduction as indicated in FIG. S1, while TEM analysis indicates that Si@$SiO_x$N/A has a secondary structure. Moreover, the wide diffraction peaks indicate the secondary structure of nano-sized silicon grains embedded in the primary structures. The calculated average silicon grain sizes of the Si@$SiO_x$N/A (15.3 nm) and Si@$SiO_x$950 (15.2 nm) indicate that the subsequent heat treatment of 950° C. does not change silicon grain size of the Si@$SiO_x$ composite.

To investigate the elemental composition and the valence state of the silicon, the X-ray photoelectron spectroscopy measurement was carried out. FIG. 8*b* shows the survey spectra and indicates the existence of oxygen, silicon, boron, magnesium, and sodium in samples Si@$SiO_x$N/A and Si@$SiO_x$950. The binding energy and the content for each element were listed in Table S1. The silicon contents of Si@$SiO_x$N/A (46.1 at %) and Si@$SiO_x$950 (44.85 at %) from the XPS results are lower than that from the ICP results (52.42 at % for Si@$SiO_x$N/A and 50.87 at % for Si@$SiO_x$950), which can be due to the surficial oxidation of the samples. The much more residual boron (5.12-5.17 at % for the XPS results and 11.01-11.26 at % for the ICP results) than the sodium (0.28-0.3 at % for the XPS results and 0.75-0.78 at % for the ICP results indicates the boron exists in the products as doping. The boron doping was reported to facilitate the lithium-storage performance for the silicon-based anode.[27,28,31,32] The assignment of the Si 2p of was performed to investigate the valence stage of the Si in Si@$SiO_x$N/A and Si@$SiO_x$950. The peak assignments of Si 2p are listed in Table S2. The fitted data by the assignment of $Si^0$, $Si^{1+}$, $Si^{2+}$, and $Si^{4+}$in FIG. 8*c* and dis internally quite consistent with the observed photoemission features of the Si 2p for both samples Si@$SiO_x$N/A and Si@$SiO_x$950. The $Si^{1+}$ and $Si^{2+}$ can exist in the transition region between Si metal and silica, which integrate the Si grains and matrix and act as good stress-buffer layers to alleviate volume-change stress of silicon during cycling.

Figures 9A, 9B, 9C, 9D:
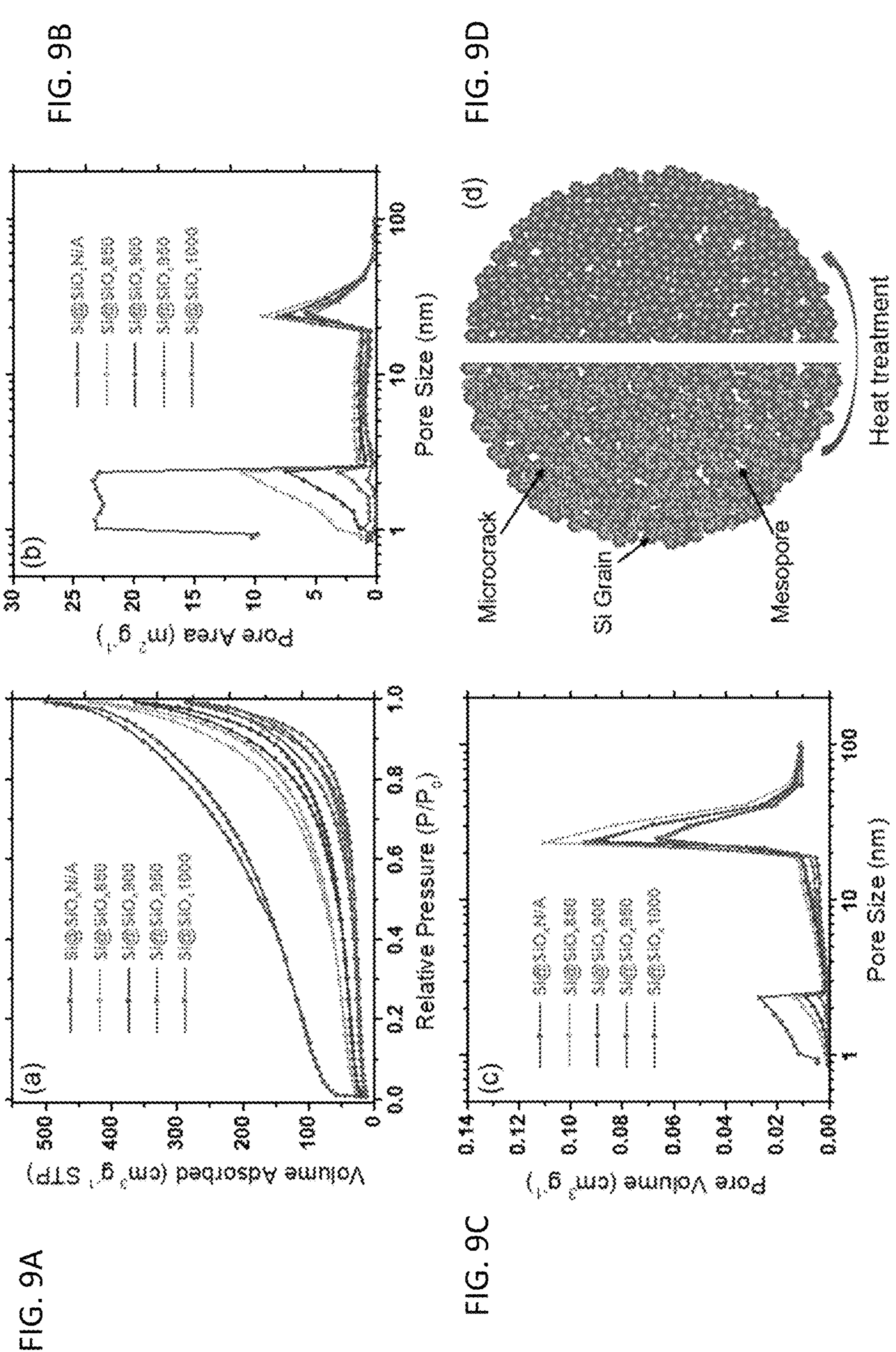
FIGS. 9A-9D (FIG. 9A) Nitrogen physisorption isotherms. Pore size distributions based on (FIG. 9B) pore area and (FIG. 9C) pore volume.

To investigate the effect of heat treatment on the microstructure, nitrogen physisorption was conducted for the magnesiothermic-reduced samples. The nitrogen physisorption isotherms in FIG. 9*a* show that there was an abrupt rise of the adsorption at the low relative pressure range ($0.005<P/P_0<0.05$) for the Si@$SiO_2$N/A sample, which indicates the existence of the micropores. The adsorption-desorption hysteresis in $P/P_0$ range from 0.5 to 0.9 is the result of intense condensation of nitrogen filling in the mesopores, indicating there are accessible mesoporous structures in the sample. The SSA of Si@$SiO_x$N/A is calculated to be as high as 308 $m^2$ $g^{-1}$ by the BET method. The BJH pore-size distributions in FIGS. 9*b* and *c* show that there are two kinds of porous structures in the Si@$SiO_x$N/A sample: nanopores smaller than 2.5 nm and mesopores with a size around 25 nm. It is worthy to be noted that the high SSA of Si@$SiO_x$N/A is mainly from the nanopores smaller than 2.5 nm as shown in FIG. 8*b*, while the pore volume of Si@$SiO_x$N/A as indicated in FIG. 9*c* is mainly due to the mesopores which were fabricated by the MgO etching with HCl. The nanopores smaller than 2.5 nm detected by the nitrogen physisorption test can be the microcracks that formed during the transformation from silica to silicon grains in the magnesiothermic reduction. Moreover, the nitrogen physisorption results show that the heat treatment did not change the mesoporous structures but reduced the microcracks effectively as illustrated in FIG. 9*d*. As a result, the SSAs can be reduced from 308, 170, 142, 91 to 87 for the samples from Si@$SiO_x$N/A, Si@$SiO_x$850, Si@$SiO_x$900, Si@$SiO_x$950 to Si@$SiO_x$1000, respectively. The microcracks almost vanished in the Si@$SiO_x$1000 sample. The elimination of the microcracks can reduce the SEI formation, and thus improve the initial Coulombic efficiency of the batteries.

Figures 10A, 10B, 10C:
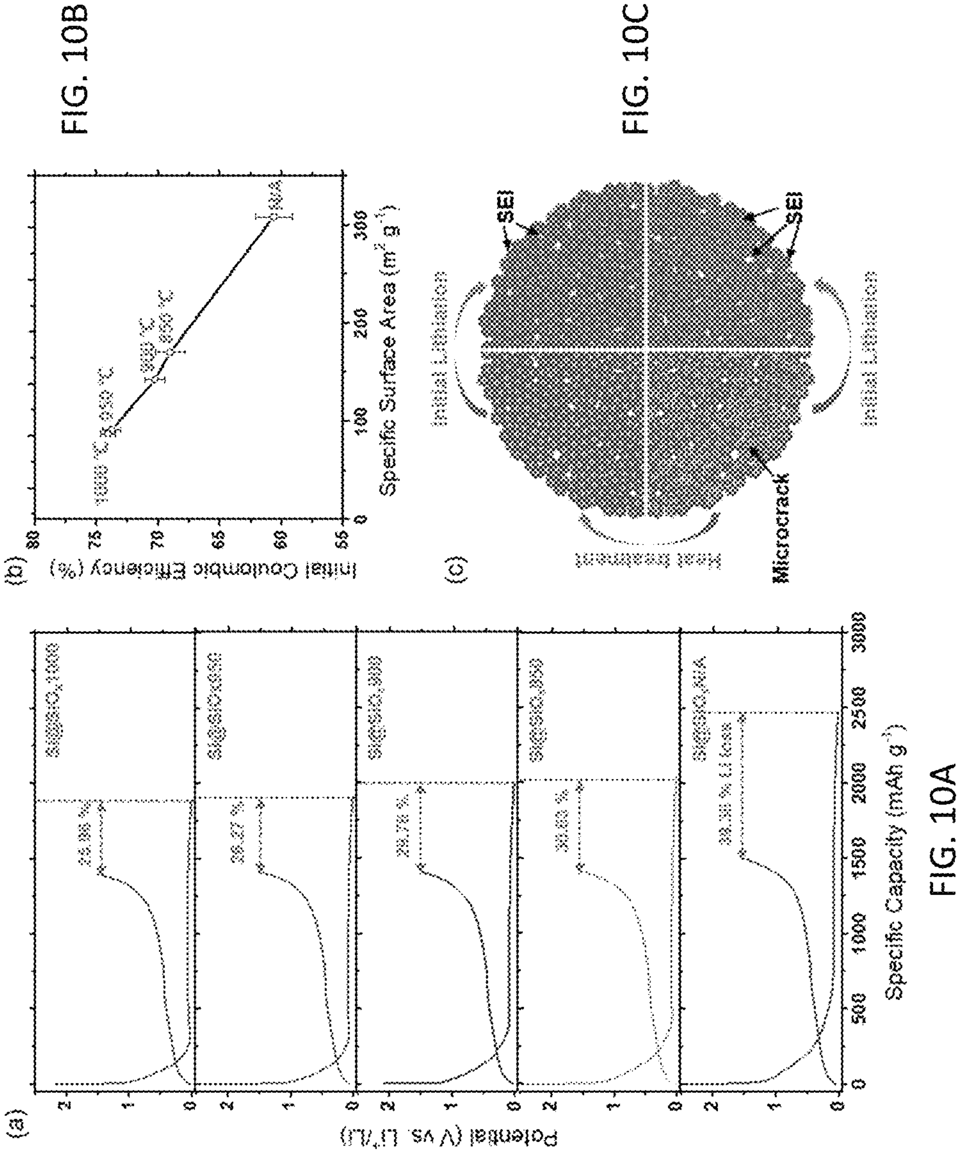
FIG. 10A-10C.

For the practical application of the silicon-based anodes, the ICE is a very worthwhile criterion to be taken into consideration, which affects much on the energy density of LIBs. In the full-cell configuration with the silicon-based anodes, the lithium ion that shuttles across the electrolyte is originally supplied from the cathode. The irreversible lithium during the shuttling results in a dead mass of the cell, and usually needs excess cathode material for compensation in the fabrication of commercial LIBs. In the initial charging/discharging process, a large proportion of the irreversible lithium is produced by the formation of the solid-electrolyte interface (SEI). The effect of the reduced SSA by the heat treatment on ICE of the synthesized anodes was investigated in half-cell configuration as shown in FIG. 10*a*. Si@SiO$_x$N/A delivered a reversible capacity of 1496 mAh g$^{-1}$ with 39.38% lithium loss in the initial lithiation/delithiation. With the heat treatment process, the lithium loss in the initial lithiation/delithiation can be reduced to 30.63%, 29.76%, 26.27%, and 25.96% despite diminutively reduced reversible capacities of 1411.8, 1409.7, 1406, and 1394 mAh g$^{-1}$ for the samples of Si@SiO$_x$850, Si@SiO$_x$900, Si@SiO$_x$950, and Si@SiO$_x$1000, respectively. The reduced reversible capacities of the heat-treated samples can result from the reduced silicon contents as measured by the ICP test as shown in Table S5. FIG. 10*b* shows the ICEs for the samples of varying SSAs with different temperatures of the heat treatment. The linear relation between the ICE and SSA demonstrates that the reduced SSAs can directly result in improved ICEs of the heat-treat samples by reducing the formation of the SEI on the microcracks which can be eliminated by heat treatment as illustrated in FIG. 10*c*.

Figure 11B:
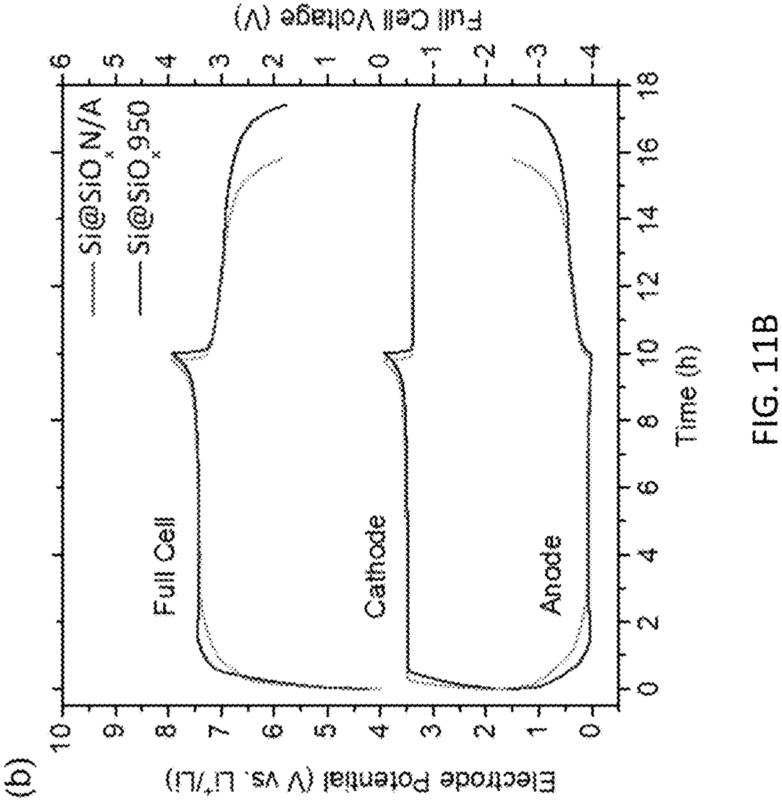
FIGS. 11A-11B.
Figure 11A:
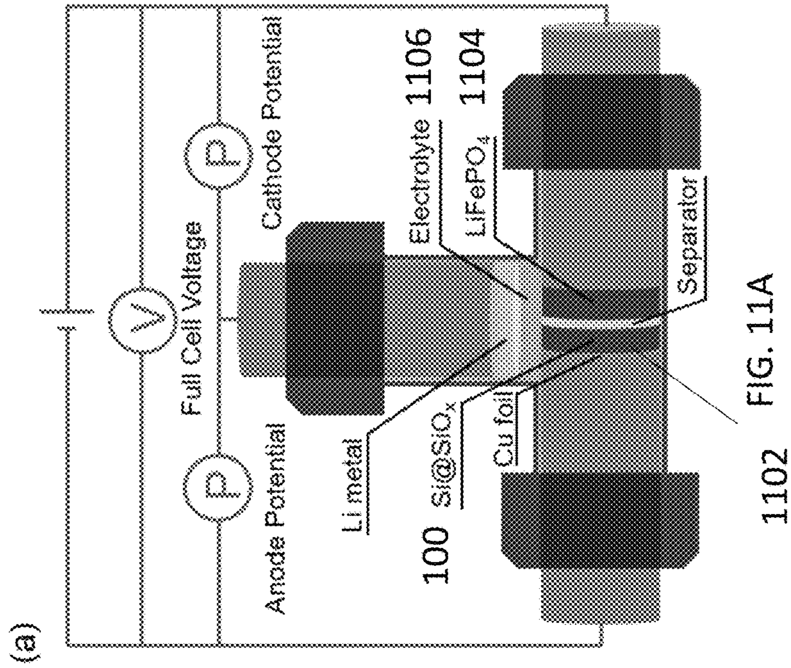

To quantify the energy density benefited from the improved ICE of the anode, Swagelok-type full cells (LiFePO$_4$/C//Si@SiO$_x$N/A and LiFePO$_4$/C//Si@SiO$_x$950) with three electrodes were fabricated by using lithium metal as the reference electrode as illustrated in FIG. 11A. The three-electrode cell can be used not only to demonstrate the performance of the full cell, but to tell the working details of each electrode as well as the coordination between each other by simultaneously collecting the data of the full-cell voltage, the cathode potential, and the anode potential. The cut-off voltage of the anode within 0.01-1.5 V was used for collecting the voltage profile of each full cell. Thus, the increased energy density due to the improved ICE of the anode can be evaluated accurately. By monitoring the voltage variation of the cathode and anode of the three-electrode full cell, the mass match for each cell where the minimum cathode provides enough lithium for the lithiation of the anode in the initial charging process was confirmed as listed in Table S6. Due to more formation of the irreversible lithium, Si@SiO$_x$N/A needs 23% more LiFePO$_4$ to be fully lithiated than Si@SiO$_x$950 in the initial charging process. As indicated in FIG. 11B, the full cell LiFePO$_4$/C//Si@SiO$_x$950 delivers a higher capacity of 126.14 mAh g$^{-1}$ (17 mA g-1×7.42 h, based on the mass of LifePO$_4$/C) than the full cell LiFePO$_4$/C//Si@SiO$_x$N/A (101.66 mAh g$^{-1}$=17 mA g-1×5.98 h) in the initial discharging process. As a result of the improved ICE of Si@SiO$_x$950, LiFePO$_4$/C//Si@SiO$_x$950 delivers a much higher energy density (362.5 Wh kg$^{-1}$ based on LiFePO$_4$/C mass) than LiFePO$_4$/C//Si@SiO$_x$N/A (294.2 Wh kg$^{-1}$ based on LiFePO$_4$/C mass), highlighting the significance of the ICE in the practical application of LIBs.

REFERENCES FOR THE FOURTH EXAMPLE (1) Guo, J. P.; Dong, D. Q.; Wang, J.; Liu, D.; Yu, X. Q.; Zheng, Y.; Wen, Z. R.; Lei, W.; Deng, Y. H.; Wang, J.; Hong, G.; Shao, H. Y. *Advanced Functional Materials.*

(2) Zuo, X. X.; Zhu, J.; Muller-Buschbaum, P.; Cheng, Y. J. *Nano Energy* 2017, 31, 113.

(3) Li, P.; Zhao, G. Q.; Zheng, X. B.; Xu, X.; Yao, C. H.; Sun, W. P.; Dou, S. X. *Energy Storage Materials* 2018, 15, 422.

(4) Jia, H. P.; Li, X. L.; Song, J. H.; Zhang, X.; Luo, L. L.; He, Y.; Li, B. S.; Cai, Y.; Hu, S. Y.; Xiao, X. C.; Wang, C. M.; Rosso, K. M.; Yi, R.; Patel, R.; Zhang, J. G. *Nature Communications* 2020, 11.

(5) Zhang, X.; Wang, D.; Qiu, X.; Ma, Y.; Kong, D.; Mullen, K.; Li, X.; Zhi, L. *Nat Commun* 2020, 11, 3826.

(6) Yang, Y.; Yuan, W.; Kang, W. Q.; Ye, Y. T.; Yuan, Y. H.; Qiu, Z. Q.; Wang, C.; Zhang, X. Q.; Ke, Y. Z.; Tang, Y. *Nanoscale* 2020, 12, 7461.

(7) Liu, Z. H.; Yu, Q.; Zhao, Y. L.; He, R. H.; Xu, M.; Feng, S. H.; Li, S. D.; Zhou, L.; Mai, L. Q. *Chemical Society Reviews* 2019, 48, 285.

(8) Luo, W.; Chen, X. Q.; Xia, Y.; Chen, M.; Wang, L. J.; Wang, Q. Q.; Li, W.; Yang, J. P. *Advanced Energy Materials* 2017, 7.

(9) Liu, Q.; Cui, Z.; Zou, R.; Zhang, J.; Xu, K.; Hu, J. *Small* 2017, 13.

(10) Li, W.; Li, Z.; Kang, W.; Tang, Y.; Zhang, Z.; Yang, X.; Xue, H.; Lee, C.-S. *Journal of Materials Chemistry* A 2014, 2, 12289.

(11) Chen, Y.; Lin, Y.; Du, N.; Zhang, Y.; Zhang, H.; Yang, D. *Chemical Communications* 2017, 53, 6101.

(12) Su, L.; Zhou, Z.; Ren, M. *Chemical Communications* 2010, 46, 2590.

(13) Su, J.; Zhao, J.; Li, L.; Zhang, C.; Chen, C.; Huang, T.; Yu, A. *Acs Applied Materials & Interfaces* 2017, 9, 17807.

(14) Zhou, J.; Lin, N.; Han, Y.; Zhou, J.; Zhu, Y.; Du, J.; Qian, Y. *Nanoscale* 2015, 7, 15075.

(15) Hou, S. C.; Chen, T. Y.; Wu, Y. H.; Chen, H. Y.; Lin, X. D.; Chen, Y. Q.; Huang, J. L.; Chang, C. C. *Scientific Reports* 2018, 8.

(16) Wen, Z.; Lu, G.; Cui, S.; Kim, H.; Ci, S.; Jiang, J.; Hurley, P. T.; Chen, J. *Nanoscale* 2014, 6, 342.

(17) Yang, Y.; Ren, J.-G.; Wang, X.; *Chui*, Y.-S.; Wu, Q.-H.; Chen, X.; Zhang, W. *Nanoscale* 2013, 5, 8689.

(18) Chen, Y.; Qian, J.; Cao, Y.; Yang, H.; Ai, X. *Acs Applied Materials & Interfaces* 2012, 4, 3753.

(19) Jia, H.; Stock, C.; Kloepsch, R.; He, X.; Badillo, J. P.; Fromm, O.; Vortmann, B.; Winter, M.; Placke, T. *Acs Applied Materials & Interfaces* 2015, 7, 1508.

(20) Zhou, D.; Jia, H. P.; Rana, J.; Placke, T.; Klopsch, R.; Schumacher, G.; Winter, M.; Banhart, *J. Journal of Power Sources* 2016, 324, 830.

(21) Zhang, P.; Wang, L.; Xie, J.; Su, L.; Ma, C.-a. *Journal of Materials Chemistry* A 2014, 2, 3776.

(22) Mu, G.; Ding, Z. P.; Mu, D. B.; Wu, B. R.; Bi, J. Y.; Zhang, L.; Yang, H.; Wu, H. F.; Wu, F. *Electrochimica Acta* 2019, 300, 341.

(23) Yoo, J.-K.; Kim, J.; Choi, M.-J.; Park, Y.-U.; Hong, J.; Baek, K. M.; Kang, K.; Jung, Y. S. *Advanced Energy Materials* 2014, 4.

(24) Li, Z. L.; Yao, N. N.; Zhao, H. L.; Yang, Z.; Fu, B. Y.; Wang, *J. Journal of the Electrochemical Society* 2020, 167.

(25) Xia, Q.; Xu, A. D.; Huang, C. Y.; Yan, Y. R.; Wu, S. P. *Chemelectrochem* 2019, 6, 4402.

(26) Park, Y. K.; Myung, Y.; Lee, J. W. Acs *Applied Energy Materials* 2020, 3, 8803.
(27) Woo, J.; Baek, S.-H.; Park, J.-S.; Jeong, Y.-M.; Kim, J. H. *Journal of Power Sources* 2015, 299, 25.
(28) Han, X.; Zhang, Z.; Chen, H.; Luo, L.; Zhang, Q.; Chen, J.; Chen, S.; Yang, Y. *Journal of Materials Chemistry* A 2021, 9, 3628.

Fifth Example: Water-Gas-Assisted Magnesiothermic Reduction (WGAMR)

A new magnesiothermic reduction method, namely Water-Gas-Assisted Magnesiothermic Reduction (WGAMR) was developed to achieve ultra-small silicon grains.

Figure 12:
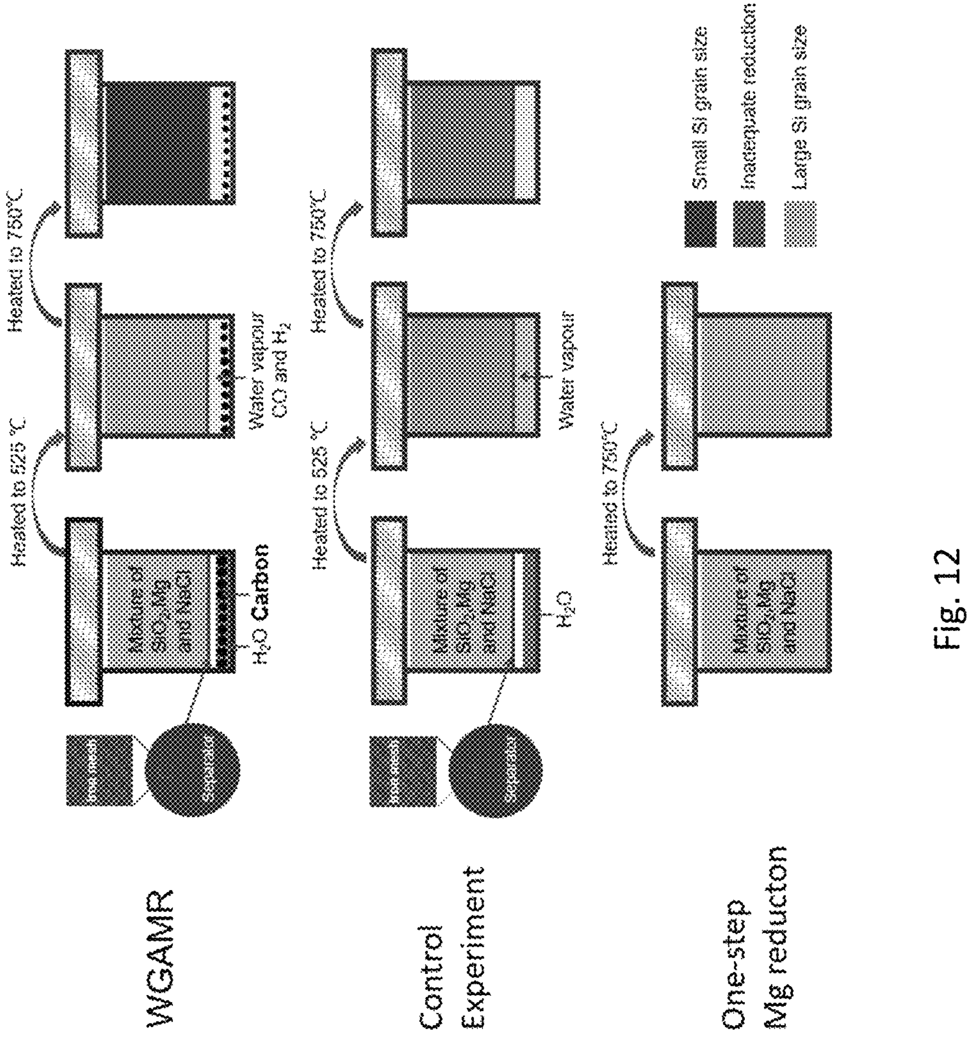
FIG. 12. Schematic illustration of the WGAMR on achieving small Si grains.

For the WGAMR, water and carbon were introduced into the magnesiothermic reduction. As illustrated in FIG. 12, the carbon and water are added at the bottom of the reactor as the precursor to produce water-gas (mixture of CO and $H_2$). An iron mesh is used as a separator to separate the manesiothermic reduction precursor and the water-gas-production precursor.

First, one-step WGAMR was conducted using 1-5 μm $SiO_2$ as precursor. As the result, a small silicon grain size of 7 nm (calculated from the XRD pattern) was achieved. Well-formed crystalline silicon domains with sizes that are consistent with the average silicon grain size calculated from the XRD result were observed in its HRTEM images.

Multi-stage WGAMR was tested next. Smaller silicon grain size even amorphous silicon was achieved. The broad peak of silicon in the XRD pattern can be due to the existence of ultra-small silicon grains (<3 nm) since we found that the silicon grains would be oxidized back to amorphous silica even with a vacuum-drying process.

A control experiment in which only water was introduced into the magnesiothermic reduction was conducted, and it was found that the reduction in the control experiment was inadequate. Here, we presume a process of the WGAMR with the increase of temperature as follows: (1) The water at the bottom of the reactor turned into vapor totally when the reaction system was heated to 100-150° C. and the water vapor was gradually distributed evenly throughout the reaction system as the temperature kept increasing before the magnesiothermic reduction happened; (2) Within the temperature range of 525-750° C., the magnesiothermic reduction was held due to the existence of the water vapor and did not happen until the temperature was high enough to trigger the water-gas reaction in which the water was kept consuming with carbon to generate reducing gas ($H_2$ and CO); (3) With the water-gas reaction as the assistant reaction, the WGAMR kept proceeding with reduced kinetics and resulted in smaller silicon grains.

Figure 13:
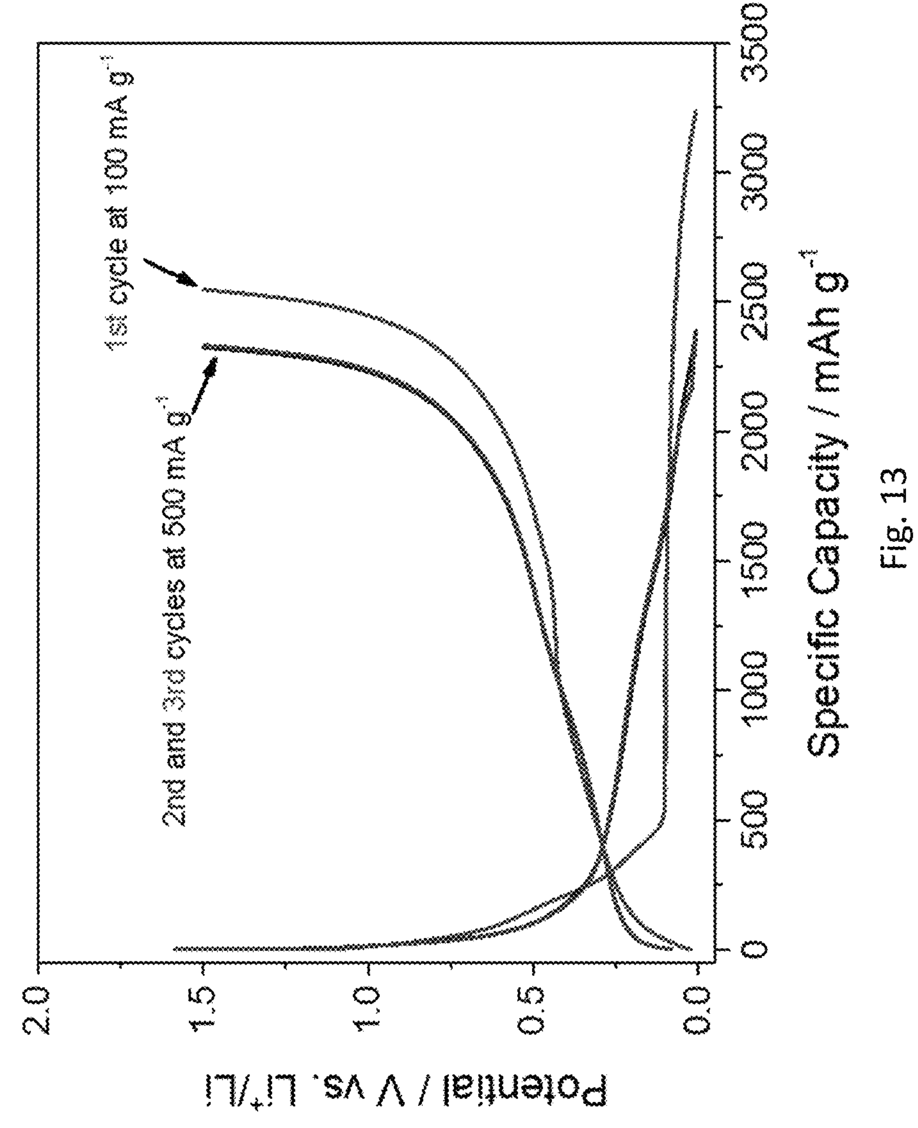
FIG. 13. Charge/discharge profiles of the initial three cycles of S231 that synthesized by the multi-stage WGAMR.

Electrochemical cycling performance of the one-step WGAMR product was tested next. After 100 cycles at 500 mA $g^{-1}$, it delivered a capacity of 490 mAh $g^{-1}$ without obvious capacity fading. The low capacity can result from inadequate reduction (low silicon content). In contrast, a multi-stage WGAMR product gave a much-enhanced reversible lithium storage capacity as high as 2546 mAh $g^{-1}$ at 100 mA $g^{-1}$. Moreover, the initial Coulombic efficiency (78.75%) is among the highest ones we have ever achieved as shown in FIG. 13.

In conclusion, with the water-gas reaction as the assistant reaction, WGAMR can reduce the reaction kinetics and result in smaller silicon grains in products. A small silicon grain size of 7 nm was achieved in a one-step WGAMR. Even smaller silicon grain size or amorphous silicon was achieved from multi-stage WGAMR. A capacity as high as 2546 mAh $g^{-1}$ was achieved by using the combination of WGAMR and multistage reduction.

Sixth Example

Figure 14:
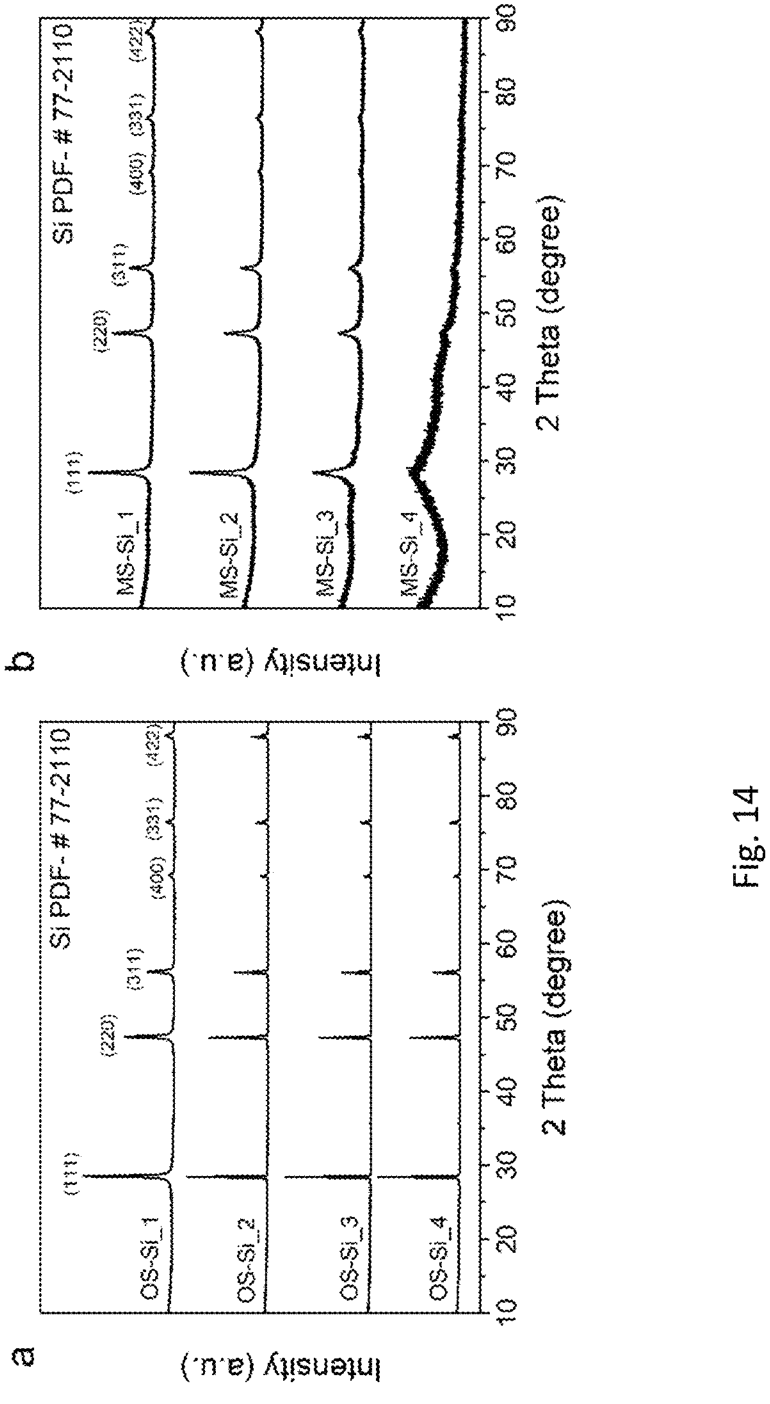
FIGS. 14A-14B. XRD patterns of (FIG. 14A) one-step reduced samples and (FIG. 14B) multi-stage reduced samples from the Stöber silica nanoparticles.

We also explored the bottom-up synthesis of silicon nanoparticles from the Stöber silica nanoparticles with the multi-stage magnesiothermic reduction. A modified Stöber method was employed to synthesize amorphous silica nanoparticles as the reduction precursor.[28] By controlling the dosage of the Triton X-100 in the preparation (0.45 g, 0.75 g, 1.55 g and 4 g for the synthesis of S-SiO2_1, S-SiO2_2, S-SiO2_3 and S-SiO2_4 respectively), silica nanoparticles with different sizes (5-20 nm) were achieved. The particle size of the Stöber silica reduces as the dosage increases in the preparation (from S-SiO2_1, S-SiO2_2, S-SiO2_3, to S-SiO2_4). FIGS. 14*a* and 14*b* show the XRD patterns of the samples reduced from Stöber silica nanoparticles with the one-step reduction and multi-stage reduction, respectively. The wider diffraction peaks of the multi-stage reduced samples (MS-Si_1, MS-Si_2, MS-Si_3, and MS-Si_4 reduced from S-SiO2_1, S-SiO2_2, S-SiO2_3, and S-SiO2_4, respectively) than those of the one-step reduced samples (OS-Si_1, OS-Si_2, OS-Si_3, and OS-Si_4 reduced from S-SiO2_1, S-SiO2_2, S-SiO2_3, and S-SiO2_4, respectively) indicate smaller silicon grain sizes in the multi-stage reduced samples. The silicon grain sizes were calculated by the Scherrer equation. For the one-step reduced samples, the resulting silicon grain sizes increased from 23.8 nm to 54.2 nm to 56.3 nm to 57.6 nm when we kept using smaller and smaller Stöber silica nanoparticles (from 20 to 5 nm) as reduction precursors. It is reasonable that smaller Stöber silica nanoparticle has higher reduction reaction activities and results in the greater positive feedback effect of the magnesiothermic reduction and the bigger silicon grain size in the product. While, in the multi-stage reduced samples, the resulting silicon grain sizes decrease (from 14.1 nm to 12.1 nm to 7.5 nm to amorphous) as the smaller and smaller Stöber silica nanoparticles are used as reduction precursors. An ultra-small silicon grain size of 7.5 nm was achieved when we used S-SiO2_3 (particle seize ~ 10 nm) as the reduction precursor, resulting from the much reduced positive feedback effect of the multi-stage magnesiothermic reduction. The silicon grains in MS-Si_4 did not grow into large silicon domains even when S-SiO2_4 (particle size ~ 5 nm) was used as the reduction precursor. The amorphous feature of MS-Si_4 can be the result of the ultra-small size of the silicon grains and/or the partial oxidation due to the ultra-small size of the silicon grains.

In conclusion, the lessened positive-feedback effect of multi-stage reduction was demonstrated by using synthesized Stöber silica nanoparticles as reduction precursors. The ultra-small silicon grain size of 7.5 nm was achieved from Stöber silica nanoparticle with the multi-stage reduction.

Example Materials and Methods used for Examples 1-6 a. Materials

Raw borosilicate (recycled glass, 325 mesh, Vitro Minerals), Magnesium (99.5%, 325 mesh, Sigma Aldrich), NaCl (>99.5%, Fisher Scientific), and HCl were used without any purification. The borosilicate precursor used in the magnesiothermic reduction with the size of 0.5-2 μm was prepared by ball milling where 10 g borosilicate (recycled glass, 325 mesh, Vitro Minerals) was mixed with 90 g zirconia balls (1 mm in diameter) and 20 g deionized water in a 100 mL alumina jar. The ball milling was conducted with a planetary ball mill at 400 rpm for 4 h. The milled borosilicate was collected by pouring out the slurry and dried at 110° C. overnight in the air. The borosilicate precursor used in the magnesiothermic reduction with the size of 5-10 μm (the fourth example) was extracted from the 325 mesh borosilicate with a sedimentation method by simply controlling the standing time.

b. First Example Preparation of the Si@SiO$_x$ Composite

In the multi-stage (three-stage) magnesiothermic reduction, 5 g borosilicate precursor, 1.2 g Mg and 25 g NaCl were well-mixed and loaded into a sealed Swagelok reactor for the first-stage reduction. The reactor was heated to 750° C. with a heating rate of 5° C. min$^{-1}$ under flowing Ar in a quartz tube furnace. After 15 min dwelling at 750° C., the reactor was cooled down to room temperature. In the second-stage reductions, another 1.2 Mg was well-mixed with the product of the first-stage reduction. The reactor was heated to 750° C. for 30 min with the same heating and cooling condition as the first-stage reduction. The last 1.2 Mg was added into the reduction, keeping the same conditions as the second-stage reduction except for dwelling at 750° C. for 1 h for the third-stage reduction. The resultant powder was washed and etched by 400 mL 1 M HCl to remove NaCl and MgO. After washed with deionized water 3 times, the centrifugal precipitation (Si@SiO$_x$) was dried at 70° C. in the vacuum oven overnight. For the one-step magnesiothermic reduction, 5 g borosilicate precursor, 3.6 g Mg and 25 g NaCl were well-mixed and heated to 750° C. for 1.75 h, keeping other experimental conditions the same as the multi-stage magnesiothermic reduction. Samples from both multi-stage and one-step reduction were heat-treated at 950° C. for 2 h under flowing Ar as the final products of the MS-Si@SiO$_x$ and OS-Si@SiO$_x$, respectively.

c. Second Example Composite Preparation

A two-stage magnesiothermic reduction to synthesize the Si@SiO$_x$ composite (the fourth example). In the first stage reduction, 5 g borosilicate precursor, 1.6 g Mg, and 25 g NaCl were well-mixed and loaded into a sealed Swagelok reactor. The reactor was transferred to the quartz tube furnace and heated to 750° C. with a heating rate of 5° C. min-1 for 3 h under flowing Ar. In the second stage reduction, 2 g Mg was mixed with the intermediate product. The mixture was sealed in the Swagelok reactor and heated to 750° C. with a heating rate of 5° C. min-1 for 6 h under flowing Ar. The resultant powder was etched with 400 mL 1 M HCl to remove the NaCl and MgO. After being repeatedly washed with deionized water and centrifugation, the precipitation was dried at room temperature under vacuum for 48 h. The heat treatments with the Si@SiO$_x$ composite were conducted at 850, 900, 950, and 1000° C. for 2 h under flowing Ar@H$_2$ resulting in the samples Si@SiO$_x$850, Si@SiO$_x$900, Si@SiO$_x$950, and Si@SiO$_x$1000, respectively. The Si@SiO$_x$ composite that was not heat-treated is named as Si@SiO$_x$N/A.

d. Third Example Composite Preparation

In a typical four-stage magnesiothermic reduction, 5 g borosilicate precursor, 0.4 g Mg and 25 g NaCl were well-mixed and loaded into a sealed Swagelok reactor for the first-stage reduction. The reactor was heated to 750° C. with a heating rate of 5° C. min-1 under flowing Ar in a quartz tube furnace. After 15 min dwelling at 750° C., the reactor was cooled down to room temperature. In the second-stage reductions, another 0.8 Mg was well-mixed with the product of the first-stage reduction. The reactor was heated to 750° C. for 30 min with the same heating and cooling condition as the first-stage reduction. Then another 1.2 g Mg was added into the reduction, keeping the same conditions as the second-stage reduction except for dwelling at 750° C. for 1 h for the third-stage reduction. In the fourth-stage reduction, the last 1.6 g Mg was added into the reduction, keeping the same conditions as the third-stage reduction except for dwelling at 750° C. for 2 h. The resultant powder was washed and etched by 400 mL 1 M HCl to remove NaCl and MgO. After washed with deionized water 3 times, the centrifugal precipitation (Si@SiO$_x$) was dried at 70° C. in the vacuum oven overnight.

e. Fourth Example Composite Preparation

In a typical five-stage magnesiothermic reduction, 5 g borosilicate precursor, 0.4 g Mg and 25 g NaCl were well-mixed and loaded into a sealed Swagelok reactor for the first-stage reduction. The reactor was heated to 750° C. with a heating rate of 5° C. min-1 under flowing Ar in a quartz tube furnace. After 15 min dwelling at 750° C., the reactor was cooled down to room temperature. In the second-stage reductions, another 0.6 g Mg was well-mixed with the product of the first-stage reduction. The reactor was heated to 750° C. for 30 min with the same heating and cooling condition as the first-stage reduction. Then another 0.8 g Mg was added into the reduction, keeping the same conditions as the second-stage reduction except for dwelling at 750° C. for 1 h for the third-stage reduction. In the forth-stage reduction, another 1 g Mg was added into the reduction, keeping the same conditions as the third-stage reduction except for dwelling at 750° C. for 2 h. In the fifth-stage reduction, another 1.2 g Mg was added into the reduction, keeping the same conditions as the forth-stage reduction except for dwelling at 750° C. for 4 h. The resultant powder was washed and etched by 400 mL 1 M HCl to remove NaCl and MgO. After washed with deionized water 3 times, the centrifugal precipitation (Si@SiO$_x$) was dried at 70° C. in the vacuum oven overnight.

f. Material Characterization

The morphology was observed with scanning electron microscopy (SEM, ThermoFisher Apreo C LoVac FEG), transmission electron microscopy (TEM, FEI Tecnai G2), and high-resolution transmission electron microscopy (HR-TEM, FEI Tecnai G2). Lamellas of the samples that were used for line-scan elemental analysis were prepared using a gallium-focused ion beam (FIB) in a dual-beam FEI HELIOS with a milling system. The line-scan elemental analysis was performed by EDS attached on a scanning transmission electron microscopy (STEM, ThermoFisher Talos G2 200X). The phase analysis was carried out using X-ray diffraction (XRD, X-1 Empyream Powder Diff) equipped with Cu-Ka and with the scanning rate of 0.15° s$^{-1}$. The elemental contents were measured by the ICP test (see detailed methods in the Supporting Information). The elemental and valence stage analysis was characterized by X-ray photoelectron spectroscopy (XPS, ThermoFisher Escalab Xi+). Nitrogen isothermal physisorption test was carried out at 77 K with TriStar II Plus. Prior to the test, the sample was out-gassed at 250° C. for 6 h under flowing $H_2$. Specific surface area (SSA) was calculated by the Brunauer-Emmett-Teller (BET) method. Pore size distribution was obtained from the adsorption branch of the isotherm using the Barrett-Joyner-Halenda (BJH) method.

g. Electrochemical Analysis

For the fabrication of the Si@$SiO_x$ electrodes, the active material (MS-Si@$SiO_x$ or OS-Si@$SiO_x$), Super PR carbon black, and sodium polyacrylate were mixed with a weight ratio of 7:2:1. The sodium polyacrylate as the binder was introduced in the mixture by using sodium polyacrylate aqueous solution. The sodium polyacrylate aqueous solution (pH=7) was made by dissolving polyacrylic acid (Aver. MW=108000, Acros Organics) and sodium hydroxide with the weight ratio of 1:0.448 in deionized water. The slurry was ground and magnetically stirred for 5 h to get uniform and then was coated on the Cu foil by using an H-coating machine. The mass loading of the active material on each electrode was ~ 2 mg $cm^{-2}$. After dried in the vacuum oven at 70° C. overnight, the electrodes were cut and assembled in the half cells and full cells. For the half cells, the electrodes were coupled with lithium metal as the counter electrodes. Full cells were fabricated by using commercial $LiFePO_4$/C (5 μm, MTI Corporation) as the cathode and the synthesized Si@$SiO_x$ materials as the anodes. The electrolyte was 1 M $LiPF_6$ dissolved in ethylene carbonate and dimethyl carbonate (1:1 in volume). Celgard 2400 microporous polypropylene film was used as the separator. The mass match was evaluated between Si@$SiO_x$ anodes and $LiFePO_4$/C cathode by using Swagelok-type cells with three electrodes (the working electrode for cathode, the counter electrode for anode, and the reference electrode). For the cycling performance of the full cells, the Si@$SiO_x$ anodes were precycled against the lithium metal in the Swagelok-type cells, dissembled, and reassembled in the coin cells. The weight ratio of the anode to the cathode was 1:8 in the full cells. Galvanostatic charging/discharging cycling was tested on Land CT2001A. Three-electrode full cells were tested on the electrochemical workstation (Bio-logic VMP3).

h. Electrochemical Analysis (Fourth Example)

For the fabrication of the anodes, the active materials (Si@$SiO_x$N/A, Si@$SiO_x$850, Si@$SiO_x$900, Si@$SiO_x$950, or Si@$SiO_x$1000), Super P® carbon black, and sodium polyacrylate were mixed with a weight ratio of 7:2:1. The sodium polyacrylate as the binder was prepared by dissolving polyacrylic acid (Aver. MW=108000, Acros Organics) and sodium hydroxide with the weight ratio of 1:0.448 in deionized water. The slurry was ground and magnetically stirred for 5 h to get uniform and then was coated on the Cu foil by using an H-coating machine. The mass loading of the active material on each electrode was ~ 2 mg $cm^{-2}$. Full cells were fabricated by using commercial $LiFePO_4$/C (5 μm, MTI Corporation) as the cathode and the synthesized Si@$SiO_x$ materials as the anodes. For the fabrication of the cathodes, the active material ($LiFePO_4$/C) Super P® carbon black, and polytetrafluoroethylene (PTFE) were mixed in ethanol with a weight ratio of 8:1: 1. The slurry was magnetically stirred for 12 h and was vacuum-dried overnight. The solid composite ($LiFePO_4$@Super P® carbon black@PTFE) was crumbled for the weighing and matching with the active mass in each anode. The electrolyte used in the half-cell and full-cell configuration was the 1 M $LiPF_6$ dissolved in ethylene carbonate and dimethyl carbonate (1:1 in volume). Celgard 2400 microporous polypropylene film was used as the separator. Galvanostatic charge/discharge was conducted on Land CT2001A. Three-electrode full cells were tested on the electrochemical workstation (Bio-logic VMP3).

(i) Bottom-Up Synthesis of Si Nanoparticles from the Stöber Silica Nanoparticles Silica nanoparticles with controllable size (5-20 nm) were synthesized by a reported modified Stöber method.[28] In an example synthesis, 38.84 g tetraethoxysilane (TEOS, 99%, Sigma Aldrich), 5.76 g $NH_3·H_2O$ (28%, Sigma Aldrich), 3 g $H_2O$, and 0.45-4 g Triton X-100 (Laboratory grade, Sigma Aldrich) were mixed in 400 mL ethanol (99.8% Thermo Scientific) and stirred for 6 h. After aged in sealed beaker for 14 days, the collosol was vacuum dried at 50° C. for 24 h to get the white gel. The white gel was heated to 600° C. for 4 h in the air to remove the Triton X-100. The silica nanoparticles with different sizes (5-20 nm) were synthesized by varying the dosage of Triton X-100 in the preparation.

The multi-stage magnesiothermic reduction was conducted with the synthesized silica nanoparticles. In the first-stage reduction, 3 g Stöber silica, 0.6 g Mg, and 10 g NaCl were well-mixed and loaded into a sealed Swagelok reactor and was heated to 550° C. with a heating rate of 5° C. $min^{-1}$ under flowing Ar in a quartz tube furnace. After holding 15 min at 550° C., the reactor was cooled to room temperature. In the second-stage reduction, 0.8 g Mg was added in and well-mixed with the product of the first-stage reduction. The mixture was transferred into the sealed Swagelok reactor and heated to 600° C. for 30 min with a heating rate of 5° C. $min^{-1}$. In the third-stage reduction, the last 1.0 g Mg was added in and well-mixed with the product of the second-stage reduction. The mixture was transferred into the sealed Swagelok reactor and heated to 700° C. for 1 h with a heating rate of 5° C. $min^{-1}$. The resultant powder was washed and etched with 300 mL 1 M HCl to remove NaCl and MgO. After being washed with deionized water 3 times, the centrifugal precipitation (Si@$SiO_x$) was dried at 70° C. in a vacuum oven overnight. In the one-step magnesiothermic reduction with the synthesized Stöber silica nanoparticles, 3 g Stöber silica, 2.4 g Mg and 10 g NaCl were well-mixed and heated to 550° C. for 1.75 h, keeping other experimental conditions the same as for the multi-stage magnesiothermic reduction.

Further Example Preparation Methods, Modifications and Variations

1. Example Starting Material a. The silicon-containing starting materials include, but are not limited to, amorphous silica, crystalline silica (quartz or purified sand), borosilicate and soda lime, silicon monoxide, and Stöber silica.
b. The general and preferred sizes of the starting materials are: 0.5-10 μm for pure silica (amorphous silica or crystalline silica), 0.5-45 μm for borosilicate, soda lime, and silicon monoxide.
c. The processes to prepare the starting materials to the desired particle size includes: ball milling (e.g. planetary milling), jet milling, and sedimentation method.

Reactivity of the starting materials is affected by their particle size and uniformity. Smaller particles tend to have higher reactivity.

In one or more embodiments, borosilicate with an average particle size around or less than 1 μm is used for uniform reduction and high product silicon content. In one or more embodiments, borosilicate with bigger particle size (e.g. 2 μm, 0.5-2 μm, 1-5 μm, or 5-10 μm) is used in the multi-stage reduction to reduce the product SSA, increase the tap density of the product, and reduce product oxidation during post treatment processes.

2. Example Multi-Stage Magnesiothermic Reduction Processes a. Multi-stage magnesiothermic reduction applied using 2-10 stages.
b. In the multi-stage magnesiothermic reduction, different reactant mass ratios (e.g., $SiO_2$ (or soda line, or borosilicate): Mg from 10:1 to 5:3, different temperature-control-agent mass ratios (e.g., from 5:1 to 1:1 for temperature-control agent: silicon-containing reactant) and dwell temperatures (500-800° C.) are adjustable in each stage. The overall mass ratios of silicon-containing reactants with Mg can be in the range of 10:1 to 10:9. In the following discussions, $SiO_2$ is also used to represent various silicon-containing starting materials listed in this application including, but not limited to, those listed in "Example Starting Material" 1a.
c. The different temperature-control agents include, but are not limited to NaCl, $MgCl_2$, NaBr, NaI, KCl, KBr, KI, LiCl, LiBr, LiI, and mixture of NaCl and KCl and can be applied in each stage of the multi-stage reduction.

Properties (silicon grain size, uniformity, silicon content and SSA) of the product from magnesiothermic reduction are sensitive to many factors, including the quantity of Mg in the reduction reaction, the quantity of temperature control-agent, the type of temperature control agent, the reaction temperature and time, the environment of the reaction.

In one or more embodiments, silicon content in the product increases in each stage of the magnesiothermic reduction.

In one or more embodiments, silicon grain size in the product from multi-stage reductions is smaller than that in the product from one-step reduction.

In each step/stage of the multi-stage magnesiothermic reduction, the quantity of Mg is carefully selected to achieve the desired silicon content while minimize silicon nanograin size and SSA, optimize silicon nanograin uniformity.

Too little Mg will lead to insufficient reduction and low silicon content, too much Mg will consume the reduced silicon by forming $Mg_2Si$, which reduce silicon content too. In one or more embodiments, $SiO_2$ to Mg weight ratio in the range of 10:1 to 5:3 is used.

In one or more embodiments, the starting material and the Mg powder are well-mixed before the reaction. In another embodiment, the starting material and the Mg powder are separated, and the starting material reacts with Mg vapor during the reaction. In some embodiments, mixed reaction is preferred for high silicon content and large-scale synthesis. Temperature-control agents can be selected from, but are not limited to NaCl ($T_m$=801° C.), $MgCl_2$ ($T_m$=714° C.), NaBr ($T_m$=747° C.), NaI ($T_m$=661° C.), KCl ($T_m$=770° C.), KBr ($T_m$=734° C.), KI ($T_m$=681° C.), LiCl ($T_m$=605° C.), LiBr ($T_m$=552° C.), LiI ($T_m$=469° C.), and the mixture of thereof (where $T_m$ is the melting temperature). The same or different temperature control agent can be used in each stage of the multi-stage reduction. In one or more embodiments, a temperature control agent with a lower melting point is preferred which can be used to control the ceiling (cut-off) temperature of the reaction. A good or proper amount of temperature-control agent is important to adequately absorb the excessive heat from the reaction and maintain a controlled reaction temperature. A spike of reaction temperature may lead to large and non-uniform silicon grain size, and the formation of $Mg_2Si$. In one or more embodiments, the ratio of starting material to temperature-control agent in a range of 1:2.5 to 1:5 to 1:10 (wt:wt) can be used.

In one or more examples, a sufficient amount of the one or more temperature control agents is added in each stage so that the reduction reaction stabilizes at (or below) the melting temperature of the temperature control agent. The magnesiothermic reaction is highly exothermic, but the temperature control agent can absorb a lot of heat when melting, maintaining or stabilizing the reaction temperature close to or below the control temperature (the temperature of the furnace) in the multi-stage reaction (see FIG. 4*b-d*). In the one stage reaction (FIG. 4*a*), because more Mg is used, the reaction temperature overshoots way above the temperature of the furnace. Without being bound to a particular scientific theory, the inventors believe the uncontrolled temperature increase in the one stage reaction leads to larger and uneven silicon grain size. The inventors have discovered that controlling the silicon grain size is more feasibly, readily, and accurately achieved in the reduction reaction by controlling the ratio of $SiO_2$/Mg, as compared to controlling the $SiO_2$: temperature control agent (i.e. grain size varies significantly more as a function of the $SiO_2$: Mg as compared to $SiO_2$: temperature control agent). Specifically, the inventors found that a $SiO_2$: temperature control agent ratio of 1:10 in the one-step reduction did not reduce silicon grain size in the product. Since the magnesiothermic reduction is an exothermic and positive-feedback reaction, to achieve a similar grain size in the one stage reduction (as can be achieved in five-stage reduction with 1:5 ratio for the $SiO_2$: temperature control agent), would require impractically high levels of temperature control agent. Moreover, use of significantly higher amounts of temperature control agent require much larger reactors and more effort to recover the temperature control agent after the reaction.

In one or more embodiments, a mixture of temperature control agents is used so that even lower cut-off temperatures can be achieved. For example, NaCl has a melting point of 801° C. and KCl has a melting point of 770° C., while the mixture of NaCl and KCl (Na:K=0.506:0.494 in molar ratio) has a melting point as low as 657° C., which is close to the melting point of expensive NaI (661° C.). Using the mixture of NaCl and KCl not only avoids the need for using an expensive temperature-control agent, but also opens up a broad cut-off temperature range (melting points) from 657 to 801° C. through changing the composition ratio of the NaCl and KCl mixture.

In one or more embodiments, the reaction temperature is carefully controlled in a range of 500° C. to 800° C. In some embodiments, the reaction temperature is controlled to be above but close to 500° C. to minimize silicon grain size in the product. In some embodiments, higher reaction temperature can lead to fast reaction and higher product silicon content. From our study, the first stage of the reaction has a stronger effect on the silicon grain size of the product than the later stages. In some embodiments, a lower reaction temperature (e.g. 550° C. or 600° C.; e.g. by using LiBr or LiCl as the temperature-control agent) and/or a smaller amount of Mg (e.g. $SiO_2$:Mg≥10:1) was used in the first stage of the reduction to minimize silicon grain size, and a higher reaction temperature (e.g. 750° C.; e.g. by using KCl or NaCl as the temperature-control agent) and/or a larger amount of Mg (e.g. SiO2: Mg≤5:1) was used in the later stages to increase silicon content while maintain the small silicon grain size. In one or more embodiments, product with silicon content of $SiO_{0.49}$ and Si grain size of 9 nm is achieved.

In one or more examples, the reaction is under inert-gas atmosphere (Ar or $N_2$); in some examples, the reaction is under reduced-gas atmosphere (e.g. mixture of Ar and $H_2$, mixture of CO and $H_2$); In some other examples the reaction is under reduced pressure or vacuum.

3. Example Post Treatments a. The post treatments include heat-treatment, prepressing and heating, carbon-coating (e.g. poly-dopamine-coating), metal-filling, and borosilicate-welding processes. The post treatments reduce product surface area and pore volume effectively, increase product tap density, prevent or reduce the small silicon grains from oxidation, may also increase product electroconductivity and facilitating lithium-ion diffusion.
b. In a typical procedure of heat treatment, the (magnesiothermic reduced) $SiO_x$ (e.g. 0.3<x<1.8) product powder is put in a furnace and heat-treated under inert-gas atmosphere (Ar or $N_2$) or at reduced-gas atmosphere (mixture of Ar and $H_2$.) The heat treatments with different dwell temperatures (850-1000° C.) and different heating rate (1-20° C./min) are applied.
c. In a typical procedure of prepressing and heating, the $SiO_x$ product powder is put in a mold and pressed into a tablet, and then the tablet is transferred into a furnace for the heat treatment as described in b. The press pressure in the prepressing and heating process applies from 200 to 600 MPa. The holding time of pressure applies from 1 s to 10 min (e.g., at a temperature in a range 850-1000° C.).
d. The poly-dopamine-coating is applied to both aqueous and nonaqueous system: In the aqueous system, the polymerization of dopamine is triggered by Tris buffer (PH=8.5). In the nonaqueous (ethanol) system, the polymerization of dopamine is triggered by NaOH or KOH ethanol solution. In both aqueous and nonaqueous system, the mass ratio ($SiO_x$/dopamine·HCl) is from 16/1 to 1/1.

In one or more embodiments, non-aqueous system (e.g. ethanol) is preferred to reduce or avoid oxidation of silicon nanograins by the basic solution.

e. Carbon sources in the carbon-coating process include but not limited to glucose, sucrose, dopamine, and oleylamine. The mass ratio ($SiO_x$/carbon source) is from 1/1 to 16/1, or 1/2 to 4/1. In one or more embodiments, it's preferred to have ≤20 wt % of carbon in the carbon coated $SiO_x$ product; In another embodiment, it's preferred to have 10 wt %≤ /carbon/≤20 wt % in the carbon-coated product; In yet another embodiment, it's preferred to have≤10 wt % of carbon in the carbon coated product. In one or more of the embodiments, it's preferred to use oleylamine as the carbon source.

In a typical procedure of the carbon-coating process with oleylamine as carbon source, the $SiO_x$ powder is infiltrated with excess oleylamine under vacuum. Then the oleylamine-infiltrated $SiO_x$ is separated from the suspension by centrifugation at 7500-9000 rmp for 1-10 min. After the excess oleylamine is removed, the oleylamine-infiltrated $SiO_x$ is heat-treated as descripted in 2*b*.

f. Both the metal-filling and the borosilicate-welding processes aim at reducing the specific surface area of the $SiO_x$ products by blocking the porous structures and/or increasing the particle size of the products.
g. In a typical procedure of the metal-filling process, the metal (e.g. Sn or Al) powder is mixed with the $SiO_x$ in a mass ratio (1:10 to 1:1). The mixture is prepressed into tablet as described in c and heat-treated as described in b.
h. In a typical procedure of the borosilicate-welding process, borosilicate is mixed with the $SiO_x$ in a mass ratio (1:10 to 1:2). The mixture is prepressed into tablet as described in c and heat-treated as descripted in b.

Properties (silicon grain size, uniformity, silicon content and SSA) of the product are affected by the post treatment, including but not limited to 1) the pressure and the time of prepressing and heating; 2) the temperature, the time and the environment of the heat treatment; 3) the type and the quantity of carbon source and the process for carbon-coating; 4) the type and the quantity of metal source and the process for metal-filling; and 5) the quantity of borosilicate and the process of the borosilicate-welding.

The conditions of heat treatment are carefully selected to reduce product surface area and pore volume effectively, while not increasing silicon grain size, and not change silicon content too much. In some embodiments, the silicon content in the products is increased after the heat treatment. In some embodiments, higher temperature is used to more effectively reduce product SSA and pore volume.

In one or more embodiments, the press pressure in the prepressing process is in a range of 200 to 600 MPa. The holding time of pressure is in a range of 1 s to 10 minutes.

In one or more embodiments, the heat treatment dwelling temperature is in a range of (850-1000° C.); in another embodiment, the heat treatment dwelling temperature is fixed at 900° C., at 950° C. or at 1000° C.; in another embodiment, the heat treatment dwelling temperature varies in the process.

In one or more embodiments, the heat treatment is under inert-gas atmosphere (Ar or $N_2$); in another embodiment, the heat treatment is under reduced-gas atmosphere (e.g. mixture of Ar and $H_2$); In yet another embodiment, the heat treatment is under vacuum.

In one or more embodiments, a heating rate in the range of (1-20° C./min) is applied.

In one or more embodiments, the dwelling time period of the heat treatment is in a range of 1 minute to 6 hours. In another embodiment, the dwelling time of heat treatment is less than two hours. In another embodiment, the dwelling time of heat treatment is less than an hour.

In one or more embodiments, the carbon coating process effectively fill in or block the mesoporous and microporous structures in the product and reduce product SSA and pore volume.

In one or more embodiments, combination of carbon coating and heat treatment is applied to more effectively reduce product SSA and pore volume. In one or more embodiments, combination of carbon coating and heat treatment reduces the product SSA from 373.4 $m^2/g$ to 32.3 $m^2/g$ or less.

Metals with low melting point, such as Al (660° C.) and Sn (232° C.) can fill the porous structure and reduce the product SSA and pore volume effectively at temperatures lower than that for heat treatment. In one or more embodiments, combination of metal filling and heat treatment is applied to the product post treatment. In one or more embodiment, combination of metal filling and heat treatment reduces the product SSA from 308 $m^2/g$ to 16 $m^2/g$ or less and pore volume from 0.491 $cm^3/g$ to 0.131 $cm^3/g$ or lower.

In one or more embodiments, combination of prepressing and heat treatment is applied in the post treatment to effectively reduce product SSA and pore volume. In one or more embodiments, combination of prepressing and heat treatment reduces the product SSA from >300 $m^2/g$ to <35 $m^2/g$.

In one or more embodiments, combination of borosilicate-welding (taking the advantage of the low softening temperature of borosilicate around 820° C.), and heat treatment is applied in the post treatment to effectively weld the product particles together, reduce product SSA and pore volume. In one or more embodiments, the borosilicate-welding is achieved in the pressing and heating step. In one or more embodiments, combination of borosilicate-welding and heat treatment reduces the product SSA from >300 $m^2/g$ to 21 $m^2/g$ or less.

In one or more embodiments, combination of 1. carbon coating or metal filling or borosilicate-welding, 2 prepressing & heating, and 3. heat treatment is applied in the post treatment to more effectively reduce product SSA and pore volume.

In one or more embodiments, boron doping is applied either during the multi-stage reductions or in the post treatment process to adjust or increase the electric conductivity of the product.

In one or more embodiments, combination of the glass-powder borosilicate-welding, prepressing & heating and heat-treatment under reduced atmosphere (mixture of $H_2$ and Ar) reduces the product SSA to 42 $m^2/g$ while maintained product silicon grain size at 9 nm and silicon content at $SiO_{0.8}$.

4. Example Products a. Particle sizes of the products remain the same as each precursor: 0.5-10 μm for pure silica (amorphous silica or crystalline silica), 0.5-45 μm for borosilicate, soda lime, and silicon monoxide.

b. The general SSA range is from 5 to 350 $m^2 g^{-1}$ and the preferred SSA range is from 5 to 100 $m^2 g^{-1}$.

In one or more embodiments, a specific surface area (SSA) of less than 100 $m^2g^{-1}$ is preferred; in another embodiment, a specific surface area of less than 30 $m^2g^{-1}$ is preferred; in yet another embodiment, a specific surface area of less than 10 $m^2g^{-1}$ is preferred; in yet another embodiment, a specific surface area of less than 5 $m^2g^{-1}$ is preferred.

c. The general Si grain size is from 3 to 30 nm and the preferred Si grain size is from 3 to 15 nm.

In one or more embodiments, average silicon grain size of less than 15 nm is preferred; in another embodiment, average silicon grain size of less than 10 nm is preferred; in yet another embodiment, average silicon grain size of less than 7 nm is preferred; in yet another embodiment, average silicon grain size of less than 5 nm is preferred; in yet another embodiment, average silicon grain size in the range of 3-20 nm is preferred; in yet another embodiment, average silicon grain size in the range of 5-20 nm is preferred, in yet another embodiment, average silicon grain size in the range of 5-10 nm is preferred, in yet another embodiment, average silicon grain size in the range of 10-20 nm is preferred.

d. The general silicon content range is from SiO1.8 to $SiO_{0.3}$ and the preferred silicon content range is from $SiO_{0.9}$ to $SiO_{0.6}$.

In one or more embodiments, an oxygen to silicon molar ratio in the product $SiO_x$ with x less than 1.5 is preferred; in another embodiment, an oxygen to silicon molar ratio of equal to or less than 1 is preferred; in yet another embodiment, an oxygen to silicon molar ratio of equal or less than 0.8 is preferred; in yet another embodiment, an oxygen to silicon molar ratio of less than 0.6 is preferred; in yet another embodiment, an oxygen to silicon molar ratio in the range of 0.6 to 0.9 is preferred.

Appendix E of the priority application (U.S. Provisional Application Ser. No. 63/247,647) contains a comprehensive summary of properties of good samples manufactured according to embodiments described herein.

Advantages and Improvements

The electrode materials including cathode materials and anode materials are the most important parts of lithium ion batteries. For the anode materials, silicon has much higher capacity than the conventional graphite anode, so the silicon-based anodes are very attractive. Lots of efforts have been made to get them into commercial use. Since Si metal does not exist in nature, Si metal is mainly obtained by reducing silica. The magnesiothermic reduction has been considered as one of the most practical processes to obtain Si metal on a large scale in a way of scavenging oxygen from silica. The structure of Si nanoparticles in the $SiO_x$ matrix would be designed by using partial magnesiothermic reduction. However, the magnesiothermic reduction as an exothermic reaction is a positive-feedback process, which is difficult to control and always results in Si nanoparticles with uneven sizes and even unexpected large Si domains in the products. It will undermine all of the aforementioned advantages of the superior structure of Si nanoparticles in the $SiO_x$ matrix. In this invention, a multi-stage magnesiothermic reduction was employed, for the first time, to tackle the uneven reduction problems. Taking the advantage of the multi-stage magnesiothermic reduction, the optimized Si@$SiO_x$ structure with small and uniform Si grains inside was fabricated, resulting in enhanced electrochemical performance including Coulombic efficiencies (initial Coulombic efficiency and Coulombic efficiencies over cycling), cycling stability, and rate capability even without a carbon-coating modification. This will be attractive for a company want to invest in developing a commercial silicon oxide as anode material for lithium ion batteries.

After the Si@$SiO_x$ composite featuring nano-sized silicon grains embedded in the $SiO_x$ matrix was successfully fabricated by the magnesiothermic reduction with the low-cost borosilicate as precursor. Heat treatment was carried out to change the porous structure for a fundamental investigation of the relationship between ICE and porous structure of the magnesiothermic-reduced Si@$SiO_x$ composite. The nitrogen physisorption test revealed that the nanopores smaller than 3 nm, namely the microcracks, contribute to the most of SSA of the magnesiothermic-reduced Si@$SiO_x$ composite. The heat treatment eliminated the microcracks resulting in the large-extent reduction of the SSA for the magnesiothermic-reduced Si@$SiO_x$ composite. The elimination of the microcracks improved the ICE of the Si@$SiO_x$ anode materials resulting from the reduction of the formation of SEI. Swagelok-type full cells with three electrodes were fabricated to quantify the enhanced energy density in the full-cell configuration benefited from the improved ICE of Si@$SiO_x$ anode, which highlighted the significance of the ICE of the silicon-based anodes in the practical application of LIBs.

The superiority of the multi-stage magnesiothermic reduction was also demonstrated by the bottom-up synthesis of silicon nanoparticles from Stöber silica nanoparticles (5-20 nm), which prevents the reduced silicon nanoparticle from growing into large silicon domains during the reduction.

Example Process Flow

Figure 15:
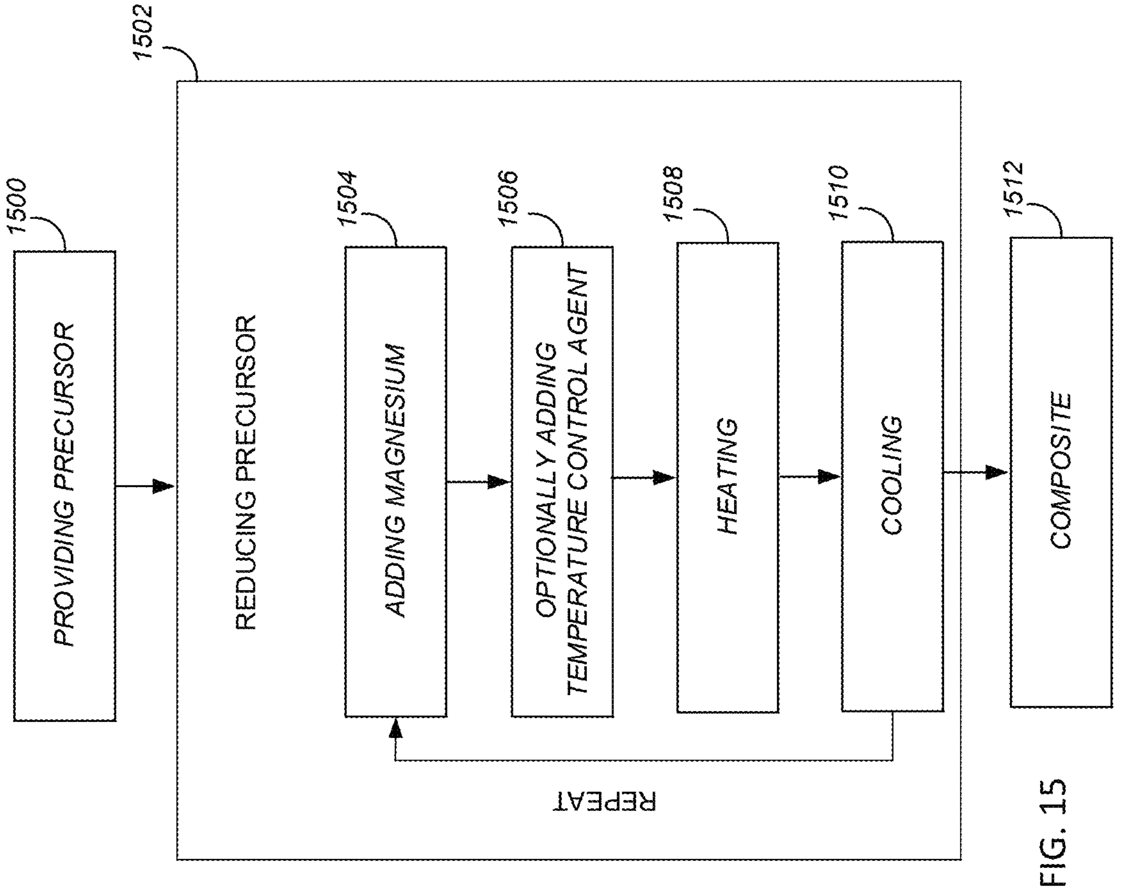
FIG. 15. Method of making a composition of matter useful as an anode active material.

FIG. 15 is a flowchart illustrating a method of making a composition of matter according to one or more embodiments.

Block 1500 represents providing a precursor comprising silicon oxide.

Block 1502 represents reducing the precursor using a multi-stage magnesiothermic reduction reaction so as to form a composite comprising silicon and oxygen.

In one or more examples, the method further comprises:

- adding a mixture of the precursor, magnesium, and optionally any temperature control agents to a reactor in a first region of the reactor;
- optionally, adding water and a carbon precursor to a second region of the reactor at a bottom of the reactor, wherein the first region and the second region are separated by a porous or permeable separator through which water vapor may be transmitted and the first region is above the second region; and
- performing the multi-stage magnesiothermic reduction reaction comprising heating the reactor so that the first region and the optional second region of the reactor are at a temperature in a range of 500-800 degrees Celsius and the temperature is increased in a plurality of stages.

In one or more examples, each stage comprises adding water (in vapor form) and carbon were introduced into the magnesiothermic reduction reaction.

In one or more examples, the multi-stage reaction comprises:

- (a) adding an amount of magnesium relative to the precursor comprising silicon dioxide in the reactor, so that a first ratio of the magnesium to the precursor in each of the stages is less than a ratio of magnesium to precursor used in a one stage magnesiothermic reaction (Block 1504);
- (b) adding a temperature control agent to form a mixture comprising the temperature control agent, the precursor, and the magnesium, so that a second ratio of the precursor to the temperature control agent in each of the stages is more than 1:25 (Block 1506);
- (c) heating the mixture to a temperature, wherein the second ratio stabilizes a temperature of the mixture to a set temperature with greater accuracy, as compared to in the one stage magnesiothermic reaction (Block 1508); and
- (d) cooling the heated mixture to room temperature below 40° C. before the adding of the magnesium in the next stage (Block 1510); wherein:
- the composite comprises particles each comprising a grain comprising silicon, the grain having a largest dimension D; and
- the ratio of the magnesium to the precursor and the set temperature in each of the stages are selected to control the largest dimension D such that 3 nanometers≤D≤30 nanometers while keeping a ratio of the precursor to any temperature control agent above 1:10; and
- the method further comprises repeating step 1504, optional step 1506, step 1508 and step 1510 in a multi-stage magnesiothermic reduction process.

Block 1512 represents the end result, a composition of matter useful as an anode active material. Example embodiments are discussed below.

Composition, Device, and Method Embodiments

1. A composition of matter useful as an electrode in an electrochemical cell, comprising:
   - a composite comprising a reduced compound, wherein:
   - the reduced compound comprises particles,
   - each of the particles comprise a grain embedded in silicon dioxide,
   - the grain comprises silicon,
   - the grain has a largest dimension D, and
   - 3 nanometers≤D≤20 nanometers.

2. The composition of matter of example 1, wherein the reduced compound is formed using a process comprising a multi-stage magnesiothermic reduction (e.g., 2-10 stages).

3. A composition of matter useful as an electrode in an electrochemical cell, comprising:
   - a composite comprising a compound formed using a multi-stage magnesiothermic reduction reaction, wherein the compound comprises particles comprising silicon and oxygen.

4. The composition of matter of example 2 or 3, wherein the reduced compound is reduced from at least one precursor or starting material selected from at least one of amorphous silica, crystalline silica (quartz or purified sand), borosilicate and soda lime, silicon monoxide, or Stöber silica.

5. The composition of matter of example 4, wherein:
   - the starting material or precursor comprises precursor particles each having a largest diameter D2,
   - 0.5 μm≤D2≤10 μm for the amorphous silica or crystalline silica or
   - 0.5 μm≤D2≤45 μm for the borosilicate, soda lime, and the silicon monoxide.

6. The composition of matter of example 4 or 5, wherein prior to the magnesiothermic reduction, the precursor is prepared using at least one process selected from ball milling, jet milling, or a sedimentation method.

7. The composition of matter of any of the examples 2-6, wherein:
   - the multi-stage magnesiothermic reduction comprises repeating the reaction $SiO_2$ (s)+2Mg (g)→Si(s)+2MgO (s),
   - the precursor comprises the $SiO_2$ and
   - the product comprising silicon from one stage is used as the precursor comprising the $SiO_2$ in a next stage.

8. The composition of matter of example 7, wherein a reactant mass ratio $SiO_2$:Mg in each of the stages of the magnesiothermic reduction is 5:3≤$SiO_2$:Mg≤10:1.

9. The composition of matter of any of the examples 7 or 8, wherein each stage of the reaction is in a presence of a temperature-control-agent comprising at least one of NaCl, NaBr, KCl, LiCl, LiBr, LiI, or a mixture of NaCl and KCl.

10. The composition of matter of example 9, wherein a mass ratio temperature-control agent: reactant in each stage is 1:1≤temperature-control agent:reactant≤5:1

11. The composition of matter of any of the examples 7-10, wherein each of the stages is performed at a dwell temperature T and 500° C.≤T≤800° C.

12. The composition of matter of any of the examples 1-11, wherein the composite comprises a post-treated reduced compound formed using a post treatment comprising at least one of a heat-treatment, prepressing and heating, carbon-coating (e.g. poly-dopamine-coating), a metal-filling process, and a borosilicate-welding process.

13. The composition of matter of example 12, wherein:

the heat treatment is performed or applied at one or more dwell temperatures T2 (850° C.≤T2≤1000° C.) and at one or more heating rates R (1° C./min≤R≤20° C./min).

14. The composition of matter of example 12, wherein a press pressure P applied in the prepressing and heating process is 200 MPa≤P≤600 MPa.

15. The composition of matter of example 12, wherein:

the poly-dopamine-coating is applied to the composite in an aqueous or a nonaqueous system, in the aqueous system, the polymerization of dopamine is triggered by Tris buffer (e.g., PH=8.5), and in the nonaqueous (ethanol) system, the polymerization of dopamine is triggered by NaOH or KOH ethanol solution, and in the aqueous and nonaqueous system, the mass ratio ($SiO_x$/dopamine·HCl) is 1/1≤($SiO_x$/dopamine·HCl) ≤16/1.

16. The composition of matter of example 12, wherein a carbon sources in the carbon-coating process comprises at least one of glucose, sucrose, dopamine, or oleylamine and a mass ratio ($SiO_x$: carbon source) is 1/2≤$SiO_x$: carbon source≤4/1.

17. The composition of matter of any of the examples 1-15, wherein the particles each have a largest diameter/dimension D3 equal to or within 15% or within 10% of the largest diameter/dimension of the precursor particles of the precursor.

18. The composition of matter of any of the examples 1-17, wherein the composite has a specific surface area (SSA) and 5 $m^2$ g-1≤SSA≤350 $m^2$ $g^{-1}$ or 5 $m^2$ g-1≤ SSA≤100 $m^2$ $g^{-1}$.

19. The composition of matter of any of the examples 1-18, wherein each of the grains has the largest dimension D and 3 nm≤D≤30 nm or 5 nm≤D≤20 nm.

20. The composition of matter of any of the examples 1-19, wherein the particles have a silicon content Ct (relative to oxygen) in a range and $SiO_{1.8}$≤Ct≤$SiO_{0.3}$ or $SiO_{0.9}$≤Ct≤$SiO_{0.6}$.

21. The composition of matter of any of the examples 1-20, wherein the composite has at least one of the SSA, the silicon content, the dimensions of the particles, a solid-electrolyte interphase thickness, a porosity, or a degree of cracking/fracturing wherein:

an electrochemical half cell comprising a first electrode comprising the composite, a second electrode comprising lithium, and a lithium containing electrolyte, undergoes charging, in response to a voltage applied to the anode in a range of 0.01-1.5 V vs. Li+/Li, and discharging, the charging and discharging are according to electrochemical reactions lithiating or de-lithiating the electrodes and the grains, allowing transport of the lithium by the electrolyte between the first electrode and the second electrode, and the charging and discharging has an initial coulombic efficiency of at least 70% and a reversible capacity of at least 1500 $mAhg^{-1}$.

22. The composition of matter of example 21, wherein, after 100 charging cycles, the reversible capacity is at least 1020 mAh $g^{-1}$ and the coulombic efficiency is more than 99%.

23. A fuel cell or lithium ion battery comprising an anode comprising the composition of matter of any of the examples 1-22.

24. The composition of matter of any of the examples 1-20, wherein the composite has at least one of the SSA, the silicon content, the dimensions of the particles, an amount of solid-electrolyte interphase, a porosity, or a degree of cracking/fracturing wherein:

an electrochemical full cell comprising a first electrode comprising the composite, a second electrode (e.g., comprising lithium or lithium containing cathode materials, e.g., lithium metal or lithium ions) comprising mobile lithium, and a lithium containing electrolyte, undergoes charging, in response to a potential applied to the anode in a range of 0.01-1.5 V vs. Li+/Li, and discharging, the charging and discharging are according to electrochemical reactions lithiating or de-lithiating the electrodes and the grains so as to allow transport of the mobile lithium by the electrolyte between the first electrode and the second electrode, and the charging and discharging has a coulombic efficiency of at least 99% and the electrochemical full cell has a reversible capacity of at least 130 $mAhg^{-1}$ after 50 cycles of charging.

25. The composition of matter of any of the examples 21-24, wherein any cracks in the composite have a thickness less than 3 nm and any pores in the composite have a volume less than 0.02 $cm^3$ $g^{-1}$.

26. The composition of matter of any of the examples 21-25, wherein a loss of lithium during de-lithiation in the first cycle is less than 33%.

27. A method of making a composition of matter useful as an electrode in an electrochemical cell, comprising:

providing a precursor comprising silicon oxide; and reducing the precursor using a multi-stage magnesiothermic reduction reaction so as to form a composite comprising silicon and oxygen.

28. The method of example 27, wherein the precursor or starting material comprises at least one of amorphous silica, crystalline silica (quartz or purified sand), borosilicate and soda lime, silicon monoxide, or Stöber silica.

29. The method of example 28, wherein the starting material or precursor comprises particles each having a largest diameter of 0.5-10 μm for the amorphous silica or crystalline silica or 0.5-45 μm for the borosilicate, soda lime, and the silicon monoxide.

30. The method of example 29, wherein prior to the magnesiothermic reduction, the method further comprises preparing the precursor using at least one process selected from ball milling, jet milling, or a sedimentation method.

31. The method of any of the examples 27-30 wherein:

the multi-stage magnesiothermic reduction comprises repeating the reaction SiO2 (s)+2 Mg (g)→Si(s)+ 2MgO(s), the precursor comprises the SiO2, and the product comprising silicon from one stage is used as the precursor comprising the $SiO_2$ in a next stage.

32. The composition of example 31, further comprising adjusting or selecting a reactant mass ratio $SiO_2$: Mg in each of the stages of the magnesiothermic reduction so that 5:3≤$SiO_2$:Mg≤10:1.

33. The method of any of the examples 27-32, further comprising performing each stage of the reaction in a presence of a temperature-control-agent comprising at least one of NaCl, NaBr, KCl, LiCl, LiBr, LiI, or a mixture of NaCl and KCl.

34. The method of example 33, further comprising adjusting or selecting a mass ratio temperature-control agent: reactant in each stage so that 1:1≤temperature-control agent: reactant≤5:1

35. The method of any of the examples 27-33, further comprising adjusting or selecting a dwell temperature of the stages such that 500° C.≤T≤800° C.

36. The method of any of the examples 27-35, further comprising post treating the composite using a post treatment comprising at least one of a heat-treatment, prepressing and heating, carbon-coating (e.g. poly-dopamine-coating), a metal-filling process, and a borosilicate-welding process.

37. The method of example 36, wherein the heat treatment is performed or applied at one or more dwell temperatures T2 (850° C. ≤T2≤1000° C.) and at one or more heating rates R (1° C./min≤R≤20° C./min).

38. The method of example 36 or 37, wherein the heat treatment comprises placing the composite in a furnace and the heat treating is performed under at least one of an inert-gas atmosphere (comprising e.g., Ar or $N_2$) or at reduced-gas atmosphere (mixture of Ar and $H_2$.), or under reduced pressure or vacuum.

39. The method of example 36, wherein a press pressure P applied in the prepressing and heating process is 200 MPa≤P≤600 MPa.

40. The method of example 36 or 39, wherein the prepressing and heating comprises placing the composite in a mold and pressing the composite into a tablet for a holding time in a range from 1 second to 10 minutes;

transferring the tablet into a furnace for a heat treatment, wherein the heat treatment optionally comprises the heat treatment as described in examples 37 or 38.

41. The method of example 36, wherein:

the poly-dopamine-coating is applied to the composite in an aqueous or a nonaqueous system, in the aqueous system, the polymerization of dopamine is triggered by Tris buffer (e.g., PH=8.5), and in the nonaqueous (ethanol) system, the polymerization of dopamine is triggered by NaOH or KOH ethanol solution, and in the aqueous and nonaqueous system, the mass ratio ($SiO_x$/dopamine·HCl) is 1:1≤($SiO_x$/dopamine·HCl≤16:1.

42. The method of example 36, wherein a carbon sources in the carbon-coating process comprises at least one of glucose, sucrose, dopamine, or oleylamine and a mass ratio ($SiO_x$: carbon source) is 1:2≤$SiO_x$: carbon source≤4:1.

43. The method of example 36 wherein the metal-filling processing and the borosilicate-welding processes are under conditions reducing a specific surface area of the $SiO_x$ in the composite by blocking porous structures in the composite and/or increasing the particle size of particles in the composite.

44. The method of example 36 or example 43, wherein the metal-filling process comprises mixing metal (e.g., Sn or Al) powder with the $SiO_x$ in the composite using a mass ratio metal:$SiO_2$ such that 1:10≤MR≤1:1 wherein MR is the mass ratio.

45. The method of example 44, wherein the mixing forms a mixture of the metal and the composite, the method further comprising prepressing and heating the mixture into a tablet.

46. The method of example 45, wherein the prepressing and heating comprises:

placing the mixture in a mold or a press and pressing the mixture into a tablet for a holding time in a range from 1 second to 10 minutes (in one or more examples the pressure P applied in the prepressing and heating process is 200 MPa≤P≤600 MPa); and transferring the tablet into a furnace for a heat treatment, wherein the heat treatment optionally comprises the heat treatment as described in examples 37 or 38.

47. The method of example 36, wherein the borosilicate-welding process comprises:

mixing borosilicate with the $SiO_x$ in the composite using a mass ratio borosilicate: $SiO_2$ wherein 1:10<MR≤1:2 and MR is the mass ratio, so as to form mixture; and the method further comprising:

placing the mixture in a mold or a press and pressing the mixture into a tablet for a holding time in a range from 1 second to 10 minutes (in one or more examples the pressure P applied in the prepressing and heating process is 200 MPa≤P≤600 MPa); and transferring the tablet into a furnace for a heat treatment, wherein the heat treatment optionally comprises the heat treatment as described in examples 37 or 38.

48. The method of any of the examples 27-47, wherein each stage of the magnesiothermic reaction comprises:

(a) adding an amount of magnesium relative to the precursor comprising silicon dioxide in the reactor, so that a first ratio of the magnesium to the precursor in each of the stages is less than a ratio of magnesium to precursor used in a one stage magnesiothermic reaction;

(b) adding a temperature control agent to form a mixture comprising the temperature control agent, the precursor, and the magnesium, so that a second ratio of the precursor to the temperature control agent in each of the stages is more than 1:25;

(c) heating the mixture to a temperature, wherein the second ratio stabilizes a temperature of the mixture to a set temperature (e.g., as measured by a temperature sensor in the reactor) with greater accuracy, as compared to in the one stage magnesiothermic reaction; and (d) cooling the heated mixture to room temperature before the adding of the magnesium in the next stage; wherein:

the composite comprises particles each comprising a grain comprising silicon, the grain having a largest dimension D; and the ratio of the magnesium to the precursor and the set temperature in each of the stages are selected to control the largest dimension D such that 3 nanometers≤D≤30 nanometers while keeping a ratio of the precursor to any temperature control agent above 1:10.

49. The composition of matter of any of the examples 1-26 manufactured using the process of any of the examples 27-48.

50. The composition of matter of any of the examples 1-26 or 49, wherein the largest dimension of each of the grains are all within 5% of each other.

51. An electrochemical cell (e.g., fuel cell or lithium ion battery) comprising:

an anode comprising the composition of matter of any of the examples 1-26 or 49;

an electrolyte comprising $LiPF_6$ (e.g., 1M $LiPF_6$) dissolved in ethylene carbonate and dimethyl carbonate; and a cathode coupled via the electrolyte to the anode, wherein the cathode comprises at least one of $LifePO_4$, $LiMnPO_4$, $LiCoO_2$, or $LiNi_xCo_yMn_zO_2$.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A composition of matter useful as an electrode in an electrochemical cell, comprising:

a composite comprising a reduced compound, wherein:

the reduced compound comprises a plurality of particles, each of the particles comprise a grain embedded in silicon dioxide, the grain comprises silicon, the grain has a largest dimension D, 3 nanometers≤D≤30 nanometers, and the largest dimensions of the grains in the plurality of particles are all within 5% of each other.

2. The composition of matter of claim 1, wherein the reduced compound is formed using a process comprising a multi-stage magnesiothermic reduction that forms the particles comprising grain sizes that are more uniform as compared to grain sizes formed by a one step magnesiothermic reduction process.

3. The composition of matter of claim 1, wherein the composite has a specific surface area (SSA) and $5\ m^2\ g^{-1} \leq SSA \leq 100\ m^2\ g^{-1}$.

4. The composition of matter of claim 1, wherein each of the grains has the largest dimension D and 5 nm≤D≤20 nm.

5. The composition of matter of claim 1, wherein the particles have a silicon content Ct (relative to oxygen) in a range $SiO_{1.8} \leq Ct \leq SiO_{0.3}$.

6. The composition of matter of claim 1, wherein the composite has at least one of a specific surface area (SSA), a silicon content, the dimensions of the particles, a solid-electrolyte interphase thickness, a porosity, or a degree of cracking/fracturing wherein:

an electrochemical half cell comprising a first electrode comprising the composite, a second electrode comprising lithium, and a lithium containing electrolyte, undergoes charging, in response to a voltage applied to the anode in a range of 0.01-1.5 V vs. Li+/Li, and discharging, the charging and discharging are according to electrochemical reactions lithiating or de-lithiating the electrodes and the grains, allowing transport of the lithium by the electrolyte between the first electrode and the second electrode, and the charging and discharging has an initial coulombic efficiency of at least 70% and a reversible capacity of at least 1500 $mAhg^{-1}$.

7. A fuel cell or lithium ion battery comprising an anode comprising the composition of matter of claim 1.

8. The composition of matter of claim 1, wherein the composite has at least one of a specific surface area (SSA), the silicon content, the dimensions of the particles, an amount of solid-electrolyte interphase, a porosity, or a degree of cracking/fracturing wherein:

an electrochemical full cell comprising a first electrode comprising the composite, a second electrode comprising lithium, and a lithium containing electrolyte, undergoes charging, in response to a potential applied to the anode in a range of 0.01-1.5 V vs. Li+/Li, and discharging, the charging and discharging are according to electrochemical reactions lithiating or de-lithiating the electrodes and the grains so as to allow transport of the lithium by the electrolyte between the first electrode and the second electrode, and the charging and discharging has a coulombic efficiency of at least 99% and a reversible capacity of at least 130 $mAhg^{-1}$ after 50 cycles of charging.

9. The composition of matter of claim 1, wherein any cracks in the composite have a thickness less than 3 nm and any pores in the composite have a volume less than $0.02\ cm^3\ g^{-1}$.

10. An electrochemical cell comprising:

an anode comprising the composition of matter of claim 9;

an electrolyte comprising $LiPF_6$ dissolved in ethylene carbonate and dimethyl carbonate; and a cathode coupled via the electrolyte to the anode, wherein the cathode comprises at least one of $LiFePO_4$, $LiMnPO_4$, $LiCoO_2$, or $LiNi_xCo_yMn_zO_2$.

11. The composition of matter of claim 1, wherein each of the plurality of the particles have the grain having the largest dimension within 15% of a largest dimension of precursor particles that are reduced to form the reduced compound.

12. The composition of matter of claim 1, wherein the particles comprise boron and the particles are reduced from precursor particles comprising boron.

13. The composition of matter of claim 1, wherein an average grain size of the plurality of particles is less than 9.5 nanometers.

14. The composition of matter of claim 1, wherein the composite comprises a post-treated reduced compound formed using a post treatment comprising at least one of a heat-treatment, prepressing and heating, carbon-coating, a metal-filling process, or a borosilicate-welding process.

15. A method of making a composition of matter useful as an electrode in an electrochemical cell, comprising:

providing a precursor comprising silicon oxide; and reducing the precursor using a multi-stage magnesiothermic reduction reaction so as to form a composite comprising silicon and oxygen; and wherein:

the composite comprises a reduced compound comprising a plurality of particles, each of the particles comprise a grain embedded in silicon dioxide, the grain comprises silicon, the grain has a largest dimension D, 3 nanometers≤D≤30 nanometers, and the multi-stage magnesiothermic reduction reaction forms the particles comprising grain sizes that are more uniform as compared to the grain sizes formed by a one step magnesiothermic reduction process and the largest dimensions of the grains in the plurality of particles are all within 5% of each other.

16. The method of claim 15, wherein the precursor comprises at least one of amorphous silica, quartz or purified sand, borosilicate and soda lime, silicon monoxide, or Stöber silica.

17. The method of claim 16, wherein the precursor comprises particles each having a largest diameter of 0.5-10 μm for the amorphous silica or crystalline silica or 0.5-45 μm for the borosilicate, soda lime, and the silicon monoxide.

18. The method of claim 15, wherein:

the multi-stage magnesiothermic reduction reaction comprises repeating the reaction $SiO_2(s)+2\ Mg(g) \rightarrow Si(s)+2MgO(s)$, the precursor comprises the $SiO_2$, and the product comprising silicon from one stage is used as the precursor comprising the $SiO_2$ in a next stage.

19. The composition of claim 18, further comprising adjusting or selecting a reactant mass ratio $SiO_2$:Mg in each of the stages of the magnesiothermic reduction reaction so that $5:3 \leq SiO_2:Mg \leq 10:1$.

20. The method of claim 18, further comprising performing each stage of the reaction in a presence of a temperature-control-agent comprising at least one of NaCl, NaBr, KCl, LiCl, LiBr, LiI, or a mixture of NaCl and KCl.

21. The method of claim 20, further comprising adjusting or selecting a mass ratio temperature-control agent: reactant in each stage so that 1:1≤temperature-control agent:reactant≤5:1.

22. The method of claim 18, further comprising adjusting or selecting a dwell temperature of the stages such that 500° C.≤T≤800° C.

23. The method of claim 15, wherein each stage of the magnesiothermic reduction reaction in a reactor comprises:

(a) adding an amount of magnesium relative to the precursor comprising silicon dioxide in the reactor, so that a first ratio of the magnesium to the precursor in each of the stages is less than a ratio of magnesium to precursor used in a one stage magnesiothermic reaction;

(b) adding a temperature control agent to form a mixture comprising the temperature control agent, the precursor, and the magnesium, so that a second ratio of the precursor to the temperature control agent in each of the stages is more than 1:25;

(c) heating the mixture to a temperature, wherein the second ratio stabilizes the temperature of the mixture to a set temperature with greater accuracy, as compared to in the one stage magnesiothermic reaction; and (d) cooling the heated mixture to room temperature below 40° C. before the adding of the magnesium in the next stage; wherein:

the composite comprises particles each comprising the grain comprising silicon, the grain having the largest dimension D; and the ratio of the magnesium to the precursor and the set temperature in each of the stages are selected to control the largest dimension D such that 3 nanometers≤D≤30 nanometers while keeping a ratio of the precursor to any temperature control agent above 1:10.

24. The method of claim 15, further comprising:

adding a mixture of the precursor, magnesium, and optionally any temperature control agents to a reactor in a first region of the reactor;

optionally, adding water and a carbon precursor to a second region of the reactor at a bottom of the reactor, wherein the first region and the second region are separated by a porous or permeable separator through which water vapor may be transmitted and the first region is above the second region; and performing the multi-stage magnesiothermic reduction reaction comprising heating the reactor so that the first region and the second region of the reactor are at a temperature in a range of 500-800 degrees Celsius and the temperature is increased in a plurality of stages.

* * * * *